(12) United States Patent
Fuller et al.

(10) Patent No.: US 10,753,490 B2
(45) Date of Patent: Aug. 25, 2020

(54) CLAPPER VALVE

(71) Applicant: S.P.M. Flow Control, Inc., Fort Worth, TX (US)

(72) Inventors: Nadiya Fuller, Plano, TX (US); Nuder Said, Fort Worth, TX (US); Brian C. Witkowski, Weatherford, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 0 days.

(21) Appl. No.: 16/233,711

(22) Filed: Dec. 27, 2018

(65) Prior Publication Data

US 2019/0128435 A1 May 2, 2019

Related U.S. Application Data

(63) Continuation of application No. 15/429,763, filed on Feb. 10, 2017, now Pat. No. 10,197,172.

(60) Provisional application No. 62/294,019, filed on Feb. 11, 2016.

(51) Int. Cl.
*F16K 15/14* (2006.01)
*F16K 15/03* (2006.01)
*F16K 27/02* (2006.01)
*F16K 47/00* (2006.01)

(52) U.S. Cl.
CPC ........ *F16K 15/033* (2013.01); *F16K 27/0227* (2013.01); *F16K 47/00* (2013.01)

(58) Field of Classification Search
CPC ..... F16K 47/00; F16K 15/033; F16K 27/0227
USPC ....................................................... 137/527
See application file for complete search history.

(56) References Cited

U.S. PATENT DOCUMENTS

| | | | |
|---|---|---|---|
| 398,620 | A | 2/1889 | Jobes |
| 2,888,036 | A | 5/1959 | Karl |
| 2,924,546 | A | 2/1960 | Shaw |
| 2,925,827 | A | 2/1960 | Anderson et al. |

(Continued)

FOREIGN PATENT DOCUMENTS

| GB | 2370869 A | 7/2002 |
|---|---|---|
| JP | 2000055265 A | 2/2000 |

OTHER PUBLICATIONS

International Search Report and Written Opinion received in Patent Cooperation Application No. PCT/US2013/033299, dated May 31, 2013, 7 pages.

(Continued)

*Primary Examiner* — P. Macade Nichols
(74) *Attorney, Agent, or Firm* — Wei Wei Jeang; Grable Martin Fulton PLLC

(57) ABSTRACT

A valve assembly adapted for use in oil and gas operations. In one aspect, the valve assembly includes a valve body defining an internal region, an inlet passageway, and an outlet passageway, the inlet and outlet passageways extending into the internal region; a valve seat connected to the valve body and defining a fluid passageway; a clapper extending within the internal region and defining an annular groove; and a seal extending within the annular groove of the clapper and adapted to sealingly engage the valve seat. In an example embodiment, the clapper is actuable between an open configuration, in which fluid flow is permitted through the fluid passageway; and a closed configuration, in which the seal sealingly engages the valve seat to at least partially restrict fluid flow through the fluid passageway.

20 Claims, 12 Drawing Sheets

(56) References Cited

U.S. PATENT DOCUMENTS

| | | |
|---|---|---|
| 3,075,547 A | 1/1963 | Domer |
| 3,531,345 A | 9/1970 | Torosian |
| 3,563,276 A | 2/1971 | High et al. |
| 3,813,733 A | 6/1974 | Flohr |
| 3,859,692 A | 1/1975 | Waterman et al. |
| 3,934,608 A * | 1/1976 | Guyton .................. F16K 15/03 137/527.8 |
| 4,054,153 A | 10/1977 | Guyton |
| 4,181,157 A | 1/1980 | DeCamp |
| 4,549,332 A | 10/1985 | Pouliot |
| 4,826,219 A | 5/1989 | Proehl |
| 4,930,543 A | 6/1990 | Zuiches |
| 5,027,862 A | 7/1991 | Laybourn |
| 5,507,533 A | 4/1996 | Mumma |
| 5,617,900 A | 4/1997 | Weil |
| 5,632,307 A | 5/1997 | Fawley et al. |
| 5,689,862 A | 11/1997 | Hayes et al. |
| 5,713,394 A | 2/1998 | Nygaard |
| 5,732,743 A | 3/1998 | Livesay |
| 5,814,387 A | 9/1998 | Orihara et al. |
| 5,894,864 A | 4/1999 | Rich |
| 6,102,076 A | 8/2000 | Romero, Jr. et al. |
| 6,298,882 B1 | 10/2001 | Hayes et al. |
| 6,481,457 B2 | 11/2002 | Hayes et al. |
| 7,152,622 B2 * | 12/2006 | Scaramucci .......... F16K 15/033 137/527.2 |
| 8,261,771 B2 | 9/2012 | Witkowski et al. |
| 8,490,648 B2 | 7/2013 | Scaramucci |
| 8,978,695 B2 | 3/2015 | Witkowski et al. |
| 2002/0083978 A1 | 7/2002 | Hayes et al. |
| 2010/0263760 A1 | 10/2010 | Gayaut |
| 2012/0132299 A1 | 5/2012 | Cyliax et al. |

OTHER PUBLICATIONS

Notice of Allowance received in U.S. Appl. No. 09/569,049, dated May 18, 2001, 2 pages.
Notice of Allowance received in U.S. Appl. No. 09/754,693, dated May 18, 2001, 7 pages.
Office Action received in U.S. Appl. No. 09/560,049, dated Jan. 18, 2001, 5 pages.
Office Action received in U.S. Appl. No. 13/848,426, dated Jan. 20, 2015, 6 pages.
Office Action—Restriction Requirement received in U.S. Appl. No. 13/848,426, dated Oct. 24, 2014, 7 pages.
International Search Report and Written Opinion issued by the United States International Search Authority for International Application No. PCT/US17/017381 dated May 26, 2017, 12 pages.

* cited by examiner

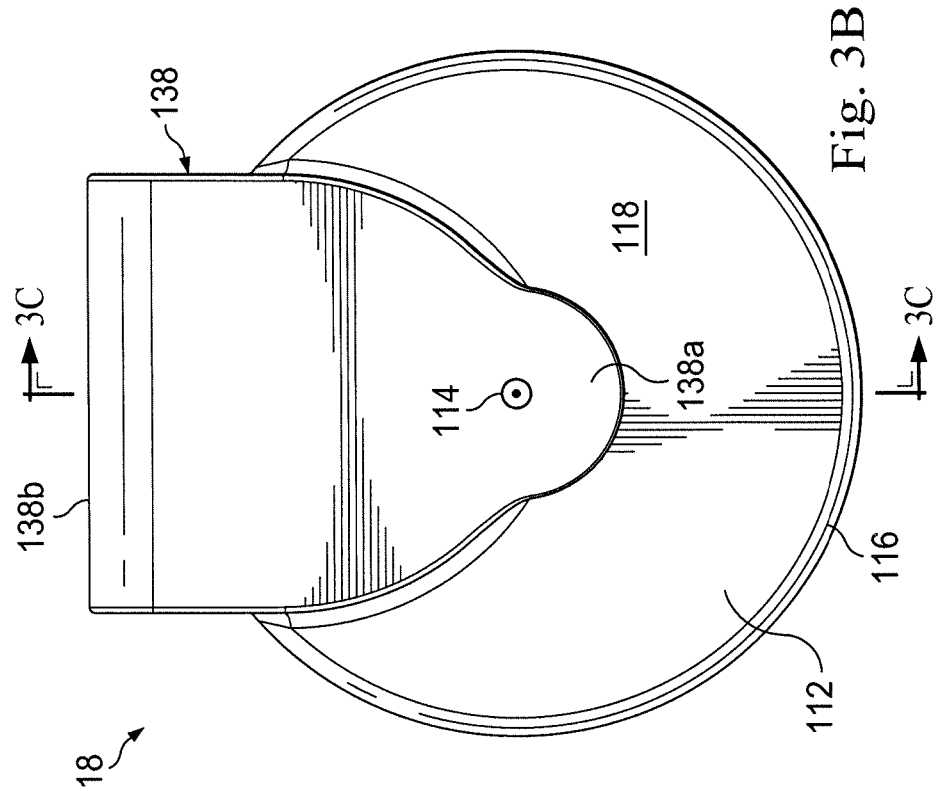
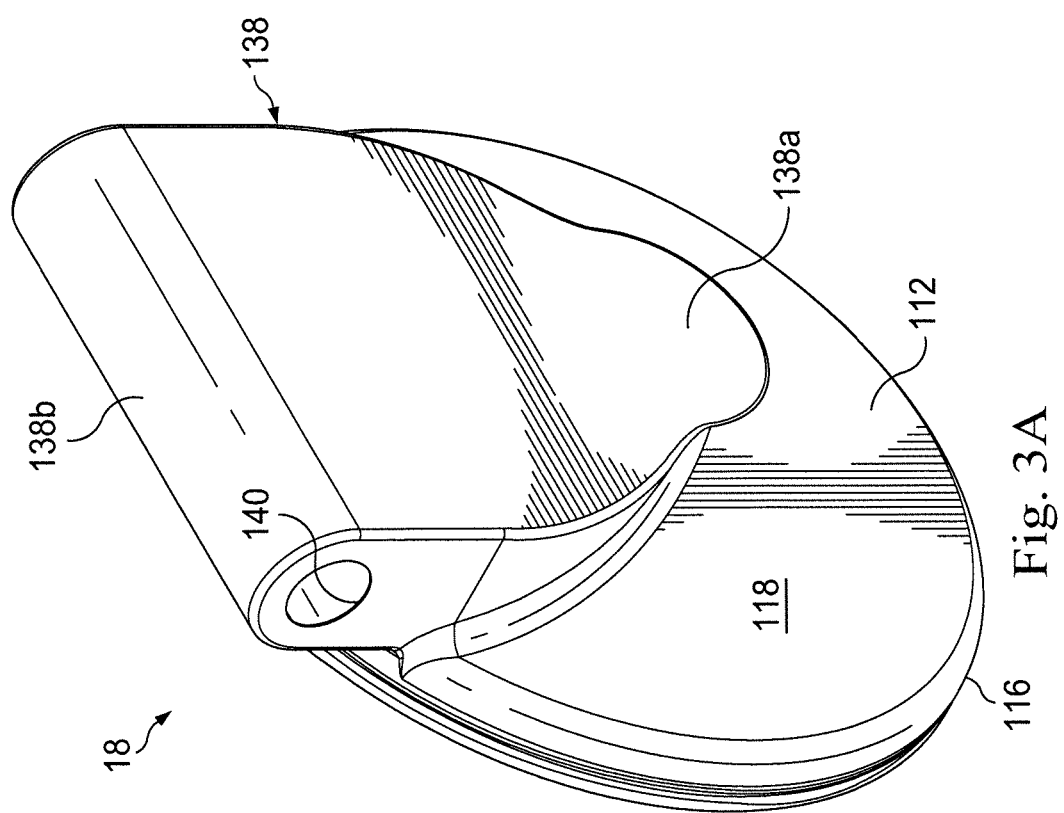

CLAPPER VALVE

CROSS-REFERENCE TO RELATED APPLICATION

This application is a continuation of U.S. patent application Ser. No. 15/429,763, filed Feb. 10, 2017, which claims the benefit of the filing date of, and priority to, U.S. provisional patent application No. 62/294,019, filed Feb. 11, 2016, the entire disclosures of which are hereby incorporated herein by reference.

TECHNICAL FIELD

The present disclosure relates in general to valves and, in particular, to clapper valves used in oil or gas operations.

BACKGROUND OF THE DISCLOSURE

In oil or gas operations, such as, for example, the fracturing or gravel packing of a subterranean wellbore, a clapper valve may be used to control the flow of fracturing and/or gravel-packing fluids. A clapper valve permits fluid flow in a first direction, but prevents, or at least reduces, fluid flow in a second direction, which is generally opposite the first direction. Any vibration caused by, for example, turbulence in the flow of fluid through the clapper valve, often produces significant wear to the internal components of the clapper valve. Moreover, the effectiveness of the clapper valve in preventing, or at least reducing, fluid flow in the second direction is often diminished as a result of improper alignment and/or excessive loading of the internal components of the clapper valve. Such issues typically cause premature deterioration of the clapper valve. Therefore, what is needed is an apparatus, system, assembly, or method to address one or more of the foregoing issues, and/or one or more other issues.

SUMMARY

In a first aspect, there is provided a valve assembly, including a valve body defining an internal region, an inlet passageway, and an outlet passageway, the inlet and outlet passageways extending into the internal region; a valve seat connected to the valve body and defining a fluid passageway, the valve seat including a first end face extending about the fluid passageway; a clapper extending within the internal region, the clapper including a second end face, an exterior surface, and an annular groove formed in the second end face and the exterior surface; and a seal extending within the annular groove of the clapper and adapted to sealingly engage the first end face of the valve seat.

In an example embodiment, the clapper is actuable between an open configuration, in which fluid flow is permitted through the fluid passageway in a first direction; and a closed configuration, in which at least the seal and the second end face contact the first end face to at least partially restrict fluid flow through the fluid passageway in a second direction, which is opposite the first direction.

In another example embodiment, the contact between the first and second end faces limits compression of the seal against the first end face.

In yet another example embodiment, the seal includes polyurethane.

In certain example embodiments, the valve body further defines an access bore intersecting the internal region, and the valve assembly further includes a hanger supported within the access bore, the clapper being connected to the hanger and pivotable between the open configuration and the closed configuration.

In an example embodiment, the seal includes an annular bulbous protrusion; and a radially-extending contact surface adapted to contact the first end face, the radially-extending contact surface being axially offset from the second end face.

In another example embodiment, the seal further includes an annular concave surface axially between the exterior surface of the clapper and the annular bulbous protrusion.

In yet another example embodiment, at the annular groove, the clapper includes first and second annular rounds and a concave surface, the first annular round adjoining the exterior surface, the second annular round adjoining the second end face, and the concave surface adjoining the first and second annular rounds.

In certain example embodiments, the first annular round is axially offset from the second end face to permit radial expansion of the seal.

In an example embodiment, the seal is bonded to at least one of: the first annular round, the second annular round, and/or the concave surface.

In a second aspect, there is provided a valve assembly, including a valve body defining an internal region, inlet and outlet passageways intersecting the internal region, and an access bore intersecting the internal region, the valve body including an internal shoulder at the access bore; a hanger supported within the access bore on the internal shoulder, the hanger defining first and second tapered slots, the first and second tapered slots each defining first and second end portions, the first and second end portions having first and second internal dimensions, respectively, the first internal dimension being less than the second internal dimension; a valve seat connected to the valve body, the valve seat defining a fluid passageway; and a clapper pivotably connected to the hanger via a pin extending within the first and second tapered slots.

In an example embodiment, the clapper is actuable between an open configuration, in which fluid flow is permitted through the fluid passageway in a first direction; and a closed configuration, in which the clapper is seated against the valve seat to at least partially restrict fluid flow through the fluid passageway in a second direction, which is opposite the first direction.

In another example embodiment, when the clapper is in the open configuration, the pin is urged toward the respective first end portions of the first and second tapered slots, thus minimizing vertical movement and/or horizontal movement of the pin relative to the hanger as a result of the first internal dimension being less than the second internal dimension.

In yet another example embodiment, when the clapper is in the closed configuration, the pin is urged toward the respective second end portions of the first and second tapered slots, thus permitting vertical movement and/or horizontal movement of the pin relative to the hanger as a result of the second internal dimension being greater than the first internal dimension.

In certain example embodiments, the hanger includes first and second hinge blocks within which the respective first and second tapered slots are formed.

In an example embodiment, the clapper includes a third hinge block extending between the first and second hinge blocks, the third hinge block defining a cylindrical passage within which the pin also extends.

In a third aspect, there is provided a valve assembly, including a valve body defining an internal region, inlet and outlet passageways intersecting the internal region, and an access bore intersecting the internal region, the valve body including an internal shoulder at the access bore; a hanger supported within the access bore on the internal shoulder; a cap connected to the valve body at the access bore; a biasing member positioned between the cap and the hanger, the biasing member urging the hanger into engagement, or near engagement, with the internal shoulder of the valve body; a valve seat connected to the valve body, the valve seat defining a fluid passageway; and a clapper pivotably connected to the hanger.

In an example embodiment, the biasing member prevents, or at least reduces, vibration and wear of the hanger and/or the clapper.

In another example embodiment, the clapper is actuable between an open configuration, in which fluid flow is permitted through the fluid passageway in a first direction; and a closed configuration, in which the clapper is seated against the valve seat to at least partially restrict fluid flow through the fluid passageway in a second direction, which is opposite the first direction.

In yet another example embodiment, the hanger includes an external shoulder against which the biasing member is constrained.

In certain example embodiments, the hanger includes an external lip, and the biasing member urges the external lip into engagement, or near engagement, with the internal shoulder of the valve body.

In a fourth aspect, there is provided a kit which, when assembled, forms a valve assembly, the kit including a valve body defining an internal region, inlet and outlet passageways intersecting the internal region, and a counterbore; a valve seat defining an external annular groove, the valve seat being adapted to be removably engaged with the valve body at the counterbore; and an annular seal extending within the external annular groove and adapted to sealingly engage the valve body when the valve seat is removably engaged with the valve body, the annular seal being twist-resistant so that, when relative motion is effected between the valve seat and the valve body, distortion of the annular seal is prevented, or at least reduced.

In an example embodiment, the valve body includes an internal threaded connection at the counterbore, and the valve seat includes an external threaded connection adapted to be threadably engaged with the internal threaded connection in response to relative rotation between the valve seat and the valve body.

In another example embodiment, the annular seal facilitates face-to-face contact, rather than point contact, between the annular seal and the valve body.

In yet another example embodiment, the annular seal has a rectangular cross-section.

In certain example embodiments, the kit further includes a clapper adapted to extend within the internal region and to be actuable between an open configuration, in which fluid flow is permitted through the fluid passageway in a first direction; and a closed configuration, in which the clapper is seated against the valve seat to at least partially restrict fluid flow through the fluid passageway in a second direction, which is opposite the first direction.

In a fifth aspect, there is provided a valve assembly, including a valve body defining an internal region, an inlet passageway, and an outlet passageway, the inlet and outlet passageways extending into the internal region; a valve seat connected to the valve body and defining a fluid passageway, the valve seat including a first end face extending about the fluid passageway; a clapper extending within the internal region, the clapper including a second end face and an annular groove formed in the second end face; and a seal extending within the annular groove of the clapper and adapted to sealingly engage the first end face, the seal including polyurethane; wherein the clapper is actuable between an open configuration, in which fluid flow is permitted through the fluid passageway in a first direction, and a closed configuration, in which at least the seal and the second end face contact the first end face to at least partially restrict fluid flow through the fluid passageway in a second direction, which is opposite the first direction.

In an example embodiment, the contact between the first and second end faces limits compression of the seal against the first end face.

In another example embodiment, the clapper further includes a circumferentially-extending exterior surface at least partially defining the annular groove.

In a sixth aspect, there is provided a valve member adapted to be seated against a valve seat that defines a fluid passageway, the valve member including a body including an end face, an exterior surface, and an annular groove formed in the end face and the exterior surface; and a seal extending within the annular groove of the body and adapted to sealingly engage the valve seat; wherein the valve member is actuable between an open configuration, in which fluid flow is permitted through the fluid passageway in a first direction, and a closed configuration, in which the valve member is seated against the valve seat to at least partially restrict fluid flow through the fluid passageway in a second direction, which is opposite the first direction.

In an example embodiment, when the valve member is in the closed configuration, at least the seal and the end face are in contact the valve seat.

In another example embodiment, the contact between the end face and the valve seat limits compression of the seal against the valve seat.

In yet another example embodiment, the seal includes polyurethane.

In certain example embodiments, the seal includes an annular bulbous protrusion; and a radially-extending contact surface axially offset from the end face and adapted to contact the valve seat when the valve member is in the closed configuration.

In an example embodiment, the seal further includes an annular concave surface axially between the exterior surface of the valve member and the annular bulbous protrusion.

In another example embodiment, at the annular groove, the body includes first and second annular rounds and a concave surface, the first annular round adjoining the exterior surface, the second annular round adjoining the end face, and the concave surface adjoining the first and second annular rounds.

In yet another example embodiment, the first annular round is axially offset from the end face to permit radial expansion of the seal.

In certain example embodiments, the seal is bonded to at least one of: the first annular round, the second annular round, and/or the concave surface.

In a seventh aspect, there is provided a kit which, when assembled, forms a valve assembly, the kit including a valve body defining an internal region, an inlet passageway, and an outlet passageway, the inlet and outlet passageways extending into the internal region; a valve seat adapted to be connected to the valve body and defining a fluid passageway, the valve seat including a first end face extending about the fluid passageway; a clapper adapted to extend within the internal region, the clapper including a second end face, an exterior surface, and an annular groove formed in the second end face and the exterior surface; and a seal extending within the annular groove of the clapper and adapted to sealingly engage the first end face of the valve seat.

In an example embodiment, the clapper is adapted to be actuable between an open configuration, in which fluid flow is permitted through the fluid passageway in a first direction; and a closed configuration, in which at least the seal and the second end face contact the first end face to at least partially restrict fluid flow through the fluid passageway in a second direction, which is opposite the first direction.

In another example embodiment, when the second end face contacts the first end face, the contact between the first and second end faces limits compression of the seal against the first end face.

In yet another example embodiment, the seal includes polyurethane.

In certain example embodiments, the valve body further defines an access bore intersecting the internal region, and the valve assembly further includes a hanger supported within the access bore, the clapper being adapted to be connected to the hanger and pivotable between the open configuration and the closed configuration.

In an example embodiment, the seal includes an annular bulbous protrusion; and a radially-extending contact surface adapted to contact the first end face, the radially-extending contact surface being axially offset from the second end face.

In another example embodiment, the seal further includes an annular concave surface axially between the exterior surface of the clapper and the annular bulbous protrusion.

In yet another example embodiment, at the annular groove, the clapper includes first and second annular rounds and a concave surface, the first annular round adjoining the exterior surface, the second annular round adjoining the second end face, and the concave surface adjoining the first and second annular rounds.

In certain example embodiments, the first annular round is axially offset from the second end face to permit radial expansion of the seal.

In an example embodiment, the seal is bonded to at least one of: the first annular round, the second annular round, and/or the concave surface.

In an eighth aspect, there is provided a kit which, when assembled, forms a valve assembly, the kit including a valve body defining an internal region, inlet and outlet passageways intersecting the internal region, and an access bore intersecting the internal region, the valve body including an internal shoulder at the access bore; a hanger adapted to be supported within the access bore on the internal shoulder, the hanger defining first and second tapered slots, the first and second tapered slots each defining first and second end portions, the first and second end portions having first and second internal dimensions, respectively, the first internal dimension being less than the second internal dimension; a valve seat adapted to be connected to the valve body, the valve seat defining a fluid passageway; and a clapper adapted to be pivotably connected to the hanger via a pin extending within the first and second tapered slots.

In an example embodiment, the clapper is adapted to be actuable between an open configuration, in which fluid flow is permitted through the fluid passageway in a first direction; and a closed configuration, in which the clapper is seated against the valve seat to at least partially restrict fluid flow through the fluid passageway in a second direction, which is opposite the first direction.

In another example embodiment, when the clapper is in the open configuration, the pin is urged toward the respective first end portions of the first and second tapered slots, thus minimizing vertical movement and/or horizontal movement of the pin relative to the hanger as a result of the first internal dimension being less than the second internal dimension.

In yet another example embodiment, when the clapper is in the closed configuration, the pin is urged toward the respective second end portions of the first and second tapered slots, thus permitting vertical movement and/or horizontal movement of the pin relative to the hanger as a result of the second internal dimension being greater than the first internal dimension.

In certain example embodiments, the hanger includes first and second hinge blocks within which the respective first and second tapered slots are formed.

In an example embodiment, the clapper includes a third hinge block adapted to extend between the first and second hinge blocks, the third hinge block defining a cylindrical passage within which the pin also extends.

In a ninth aspect, there is provided a kit which, when assembled, forms a valve assembly, the kit including a valve body defining an internal region, inlet and outlet passageways intersecting the internal region, and an access bore intersecting the internal region, the valve body including an internal shoulder at the access bore; a hanger adapted to be supported within the access bore on the internal shoulder; a cap adapted to be connected to the valve body at the access bore; a biasing member adapted to be positioned between the cap and the hanger to urge the hanger into engagement, or near engagement, with the internal shoulder of the valve body; a valve seat adapted to be connected to the valve body, the valve seat defining a fluid passageway; and a clapper adapted to be pivotably connected to the hanger.

In an example embodiment, when the biasing member is positioned between the cap and the hanger, the biasing member prevents, or at least reduces, vibration and wear of the hanger and/or the clapper.

In another example embodiment, the clapper is adapted to be actuable between an open configuration, in which fluid flow is permitted through the fluid passageway in a first direction; and a closed configuration, in which the clapper is seated against the valve seat to at least partially restrict fluid flow through the fluid passageway in a second direction, which is opposite the first direction.

In yet another example embodiment, the hanger includes an external shoulder against which the biasing member is adapted to be constrained.

In certain example embodiments, the hanger includes an external lip, and the biasing member is adapted to urge the external lip into engagement, or near engagement, with the internal shoulder of the valve body.

In a tenth aspect, there is provided a kit which, when assembled, forms a valve assembly, the kit including a valve body defining an internal region, an inlet passageway, and an outlet passageway, the inlet and outlet passageways extending into the internal region; a valve seat adapted to be connected to the valve body and defining a fluid passageway, the valve seat including a first end face extending about the fluid passageway; a clapper adapted to extend within the internal region, the clapper including a second end face at least partially defining an annular groove; and a seal extending within the annular groove of the clapper and adapted to sealingly engage the first end face, the seal including polyurethane; wherein the clapper is adapted to be actuable between an open configuration, in which fluid flow is permitted through the fluid passageway in a first direction, and a closed configuration, in which at least the seal and the second end face contact the first end face to at least partially restrict fluid flow through the fluid passageway in a second direction, which is opposite the first direction.

In an example embodiment, when the second end face contacts the first end face, the contact between the first and second end faces limits compression of the seal against the first end face.

In another example embodiment, the clapper further includes a circumferentially-extending exterior surface at least partially defining the annular groove.

In an eleventh aspect, there is provided an apparatus, including a valve member including an end face, an exterior surface, and an annular groove formed in the end face and/or the exterior surface; and a seal adapted to extend within the annular groove, the seal including an annular bulbous protrusion; and a radially-extending contact surface axially offset from the end face of the valve member, the radially-extending contact surface being adapted to contact a valve seat when the valve member is in a closed configuration.

In an example embodiment, the seal further includes an annular concave surface axially between the exterior surface of the valve member and the annular bulbous protrusion.

In a twelfth aspect, there is provided a valve assembly including a valve body defining an internal region, an inlet passageway, and an outlet passageway, the inlet and outlet passageways extending into the internal region; a valve seat connected to the valve body and defining a fluid passageway, the valve seat including a first end face extending about the fluid passageway; a clapper extending within the internal region, the clapper including a second end face at least partially defining a first annular groove; and a seal extending within the first annular groove and adapted to sealingly engage the first end face of the valve seat; wherein the clapper is actuable between: an open configuration, in which fluid flow is permitted through the fluid passageway; and a closed configuration, in which the seal sealingly engages the first end face to at least partially restrict fluid flow through the fluid passageway.

In an example embodiment, when the clapper is in the closed configuration, the second end face contacts the first end face to limit compression of the seal against the first end face.

In another example embodiment, the clapper further includes a circumferentially-extending exterior surface at least partially defining the first annular groove.

In yet another example embodiment, the seal includes an annular bulbous protrusion and a radially-extending contact surface adapted to contact the first end face when the clapper is in the closed configuration, the radially-extending contact surface being axially offset from the second end face.

In certain example embodiments, at the first annular groove, the clapper includes first and second annular rounds and a concave surface, the first annular round adjoining the exterior surface and being axially offset from the second end face to permit radial expansion of the seal, the second annular round adjoining the second end face, and the concave surface adjoining the first and second annular rounds.

In an example embodiment, the valve body further defines an access bore extending into the internal region; and the valve assembly further includes a hanger extending within the access bore, the clapper being pivotably coupled to the hanger so as to be pivotable between the open configuration and the closed configuration.

In another example embodiment, the hanger defines first and second tapered slots, the first tapered slot defining first and second end portions, the second tapered slot defining third and fourth end portions, the first and third end portions each having a first internal dimension, and the second and fourth end portions each having a second internal dimension, wherein the first internal dimension is less than the second internal dimension.

In yet another example embodiment, the hanger includes first and second hinge blocks, the first tapered slot being formed in the first hinge block, and the second tapered slot being formed in the second hinge block; the clapper includes a third hinge block extending between the first and second hinge blocks, the third hinge block defining a cylindrical passage; and the valve assembly further includes a pin extending within the first and second tapered slots and the cylindrical passage.

In certain example embodiments, when the clapper is in the open configuration, the pin is urged toward the first and third end portions of the first and second tapered slots, respectively, such that the pin is at least partially restricted from moving one or more of vertically or horizontally relative to the hanger.

In an example embodiment, when the clapper is in the closed configuration, the pin is urged toward the second and fourth end portions of the first and second tapered slots, respectively, to enable the pin to at least partially move one or more of vertically or horizontally relative to the hanger.

In another example embodiment, the valve body includes an internal shoulder at the access bore; and the valve assembly further includes a cap coupled to the valve body at the access bore and a biasing member positioned between the cap and the hanger, the biasing member urging the hanger towards the internal shoulder of the valve body.

In yet another example embodiment, the valve body further defines a counterbore and the valve seat further defines a second annular groove, the valve seat being adapted to be removably engaged with the valve body at the counterbore; and an annular seal extends within the second annular groove and is adapted to sealingly engage a portion of the valve body when the valve seat is removably engaged with the valve body, the annular seal being configured to reduce a force imparted on the annular seal when relative motion is effected between the valve seat and the valve body.

In certain example embodiments, to promote face-to-face contact between the annular seal and the valve body, the annular seal includes a sealing face extending substantially parallel to the portion of the valve body with which the annular seal is adapted to be sealingly engaged.

In a thirteenth aspect, there is provided a valve member adapted to be seated against a valve seat that defines a fluid passageway, the valve member including a body including an end face at least partially defining an annular groove; and a seal extending within the annular groove of the body and adapted to sealingly engage the valve seat; wherein the valve member is actuable between: an open configuration, in which fluid flow is permitted through the fluid passageway; and a closed configuration, in which the seal sealingly engages the valve seat to at least partially restrict fluid flow through the fluid passageway.

In an example embodiment, when the valve member is in the closed configuration, the end face contacts the valve seat to limit compression of the seal against the valve seat.

In another example embodiment, the body further includes a circumferentially-extending exterior surface at least partially defining the annular groove.

In yet another example embodiment, the seal includes an annular bulbous protrusion and a radially-extending contact surface adapted to contact the valve seat when the valve member is in the closed configuration, the radially-extending contact surface being axially offset from the end face.

In certain example embodiments, the seal further includes an annular concave surface axially between the exterior surface of the valve member and the annular bulbous protrusion.

In an example embodiment, at the annular groove, the body includes first and second annular rounds and a concave surface, the first annular round adjoining the exterior surface, the second annular round adjoining the end face, and the concave surface adjoining the first and second annular rounds.

In another example embodiment, the first annular round is axially offset from the end face to permit radial expansion of the seal.

Other aspects, features, and advantages will become apparent from the following detailed description when taken in conjunction with the accompanying drawings, which are a part of this disclosure and which illustrate, by way of example, principles of the embodiments disclosed.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements.

FIG. 3A is a perspective view of the clapper of FIGS. 1A and 1B, according to an example embodiment.

FIG. 3B is an elevational view of the clapper of FIGS. 1A, 1B, and 3A, according to an example embodiment.

DETAILED DESCRIPTION

Figure 1A:
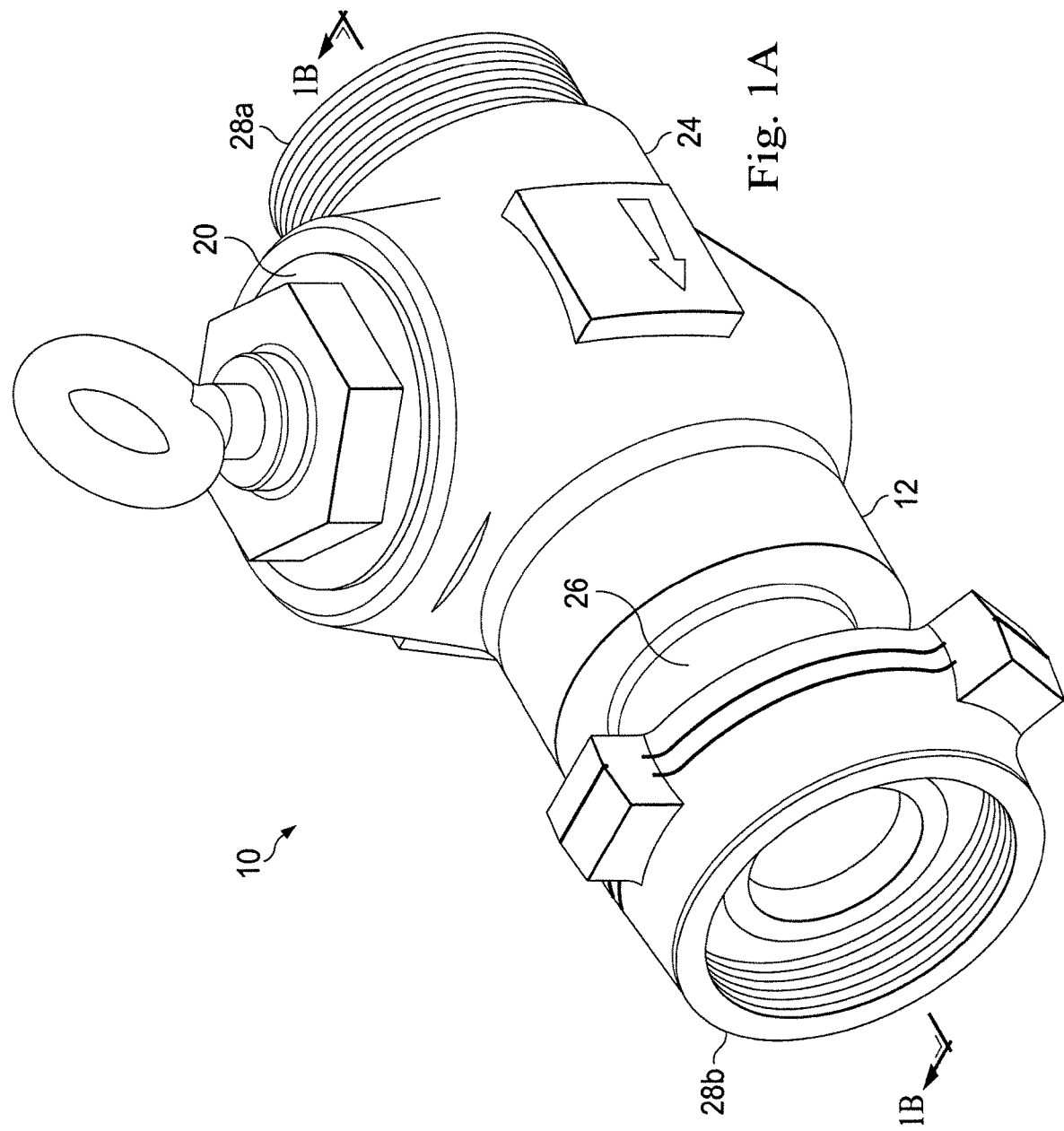
FIG. 1A is a perspective view of a clapper valve, the clapper valve including a valve body, a valve seat, a hanger, a clapper, and a cap, according to an example embodiment.
Figure 1B:
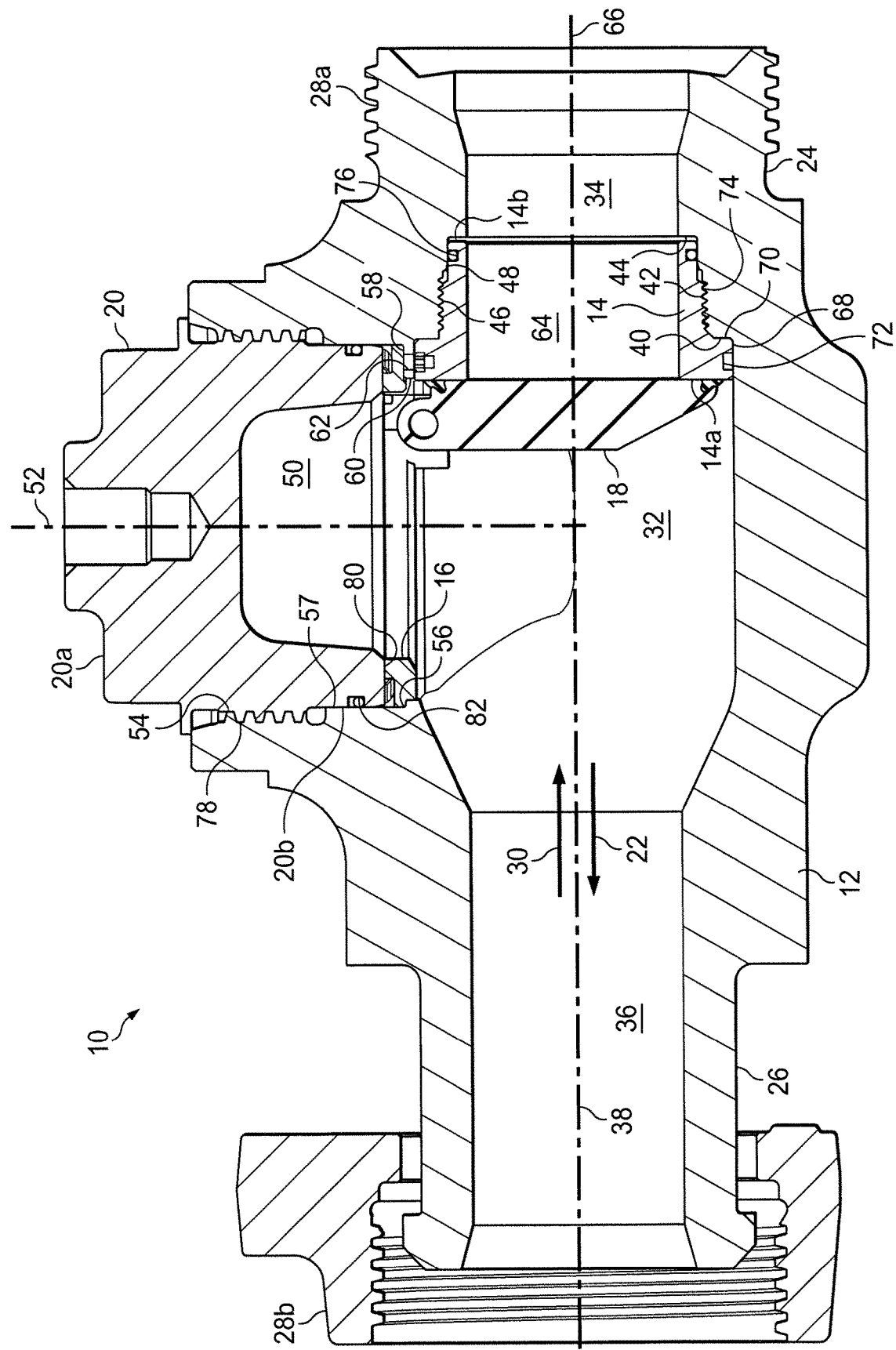
FIG. 1B is a cross-sectional view of the clapper valve of FIG. 1A, taken along line 1B-1B of FIG. 1A, according to an example embodiment.

Referring initially to FIGS. 1A and 1B, an example embodiment of a clapper valve, generally referred to by the reference numeral 10, is illustrated. The clapper valve 10 includes a valve body 12; a valve seat 14 connected to the valve body 12; a hanger 16 extending within the valve body 12 proximate the valve seat 14; a clapper 18 pivotably connected to the hanger 16 and actuable between an open configuration, in which fluid flow is permitted through the valve body 12, and a closed configuration, in which the clapper 18 is seated against the valve seat 14 to at least partially restrict fluid flow through the valve body 12; and a cap 20 connected to the valve body 12 to secure the hanger 16 in position relative to the valve seat 14. The clapper valve 10 is adapted to be incorporated into a flowline through which fluid ordinarily flows in an axial direction 22. Accordingly, the valve body 12 includes an inlet end 24 and an outlet end 26. A pair of flowline connectors 28a and 28b are associated with the inlet and outlet ends 24 and 26, respectively, of the valve body 12. The flowline connectors 28a and 28b are adapted to couple the valve body 12 in the flowline so that fluid flow through the valve body 12 is permitted in the axial direction 22 and prevented, or at least reduced, in an axial direction 30, which is opposite the axial direction 22.

In several example embodiments, at least one of the flowline connectors 28a and 28b is a male half of a hammer union. In several example embodiments, at least one of the flowline connectors 28a and 28b is a female half of a hammer union. As shown in FIGS. 1A and 1B, in an example embodiment, the flowline connector 28a is a female half of a hammer union, and the flowline connector 28b is a male half of a hammer union. In several example embodiments, at least one of the flowline connectors 28a and 28b is, includes, or is part of another type of flowline connector having components that are not associated with a hammer union, such as, for example, components associated with a hammerless union, flanges, fasteners, welds, clamps, other components, or any combination thereof.

As shown in FIG. 1B, the valve body 12 includes an internal region 32 within which at least respective portions of the valve seat 14, the hanger 16, and the clapper 18 extend. The valve body 12 further includes inlet and outlet passageways 34 and 36 intersecting the internal region 32. In several example embodiments, the inlet passageway 34 and the outlet passageway 36 extend substantially co-axially along an axis 38. An internal shoulder 40 is formed at the junction between the internal region 32 and the inlet passageway 34, facing generally in the axial direction 22. In several example embodiments, the internal shoulder 40 lies in a plane that is substantially perpendicular to the axis 38. A counterbore 42 is formed in the internal shoulder 40. The counterbore 42 extends from the internal shoulder 40 in the axial direction 30, thus including a counterbore shoulder 44 in the valve body 12. The counterbore shoulder 44 faces generally in the axial direction 22. Moreover, in several example embodiments, the counterbore shoulder 44 lies in a plane that is substantially perpendicular to the axis 38. An internal threaded connection 46 is formed in the valve body 12 at the counterbore 42. In several example embodiments, a generally cylindrical surface 48 is formed in the interior of the valve body 12, axially between the internal threaded connection 46 and the counterbore shoulder 44.

An access bore 50 is formed in the valve body 12 and intersects the internal region 32. In several example embodiments, the access bore 50 extends along an axis 52 that is substantially perpendicular to the axis 38 of the inlet and outlet passageways 34 and 36. An internal threaded connection 54 is formed in the valve body 12 at the access bore 50. Moreover, the access bore 50 includes an internal shoulder 56 in the valve body 12, facing generally toward the internal threaded connection 54. In several example embodiments, the internal shoulder 56 lies in a plane that is substantially perpendicular to the axis 52. In several example embodiments, a generally cylindrical surface 57 is formed in the interior of the valve body 12, axially between the internal threaded connection 54 and the internal shoulder 56. The internal shoulder 56 includes a ledge 58 along a side of the internal shoulder 56 adjacent the counterbore 42. The ledge 58 has a greater width or radial dimension relative to the axis 52 than the remainder of the internal shoulder 56. The width or radial dimension of the ledge 58 is the distance, along a radial line intersecting the axis 52, between the sidewall of the access bore 50 and an edge 60 of the ledge 58. The edge 60 of the ledge 58 defines a straight profile. In several example embodiments, the edge 60 of the ledge 58 lies perpendicular to, or substantially perpendicular to, the axis 38 of the inlet and outlet passageways 34 and 36. Alternatively, the edge 60 of the ledge 58 may define a curvilinear profile. One or more openings 62 extends through the ledge 58 into the internal region 32. In several example embodiments, at least one of the openings 62 are threaded holes.

The valve seat 14 includes opposing end faces 14a and 14b. A fluid passageway 64 extends through the valve seat 14 along an axis 66, which axis 66 is substantially co-axial with the axis 38. In several example embodiments, the end faces 14a and 14b lie in a plane that is substantially perpendicular to the axis 66. The valve seat 14 includes a flange 68 formed in the exterior thereof, proximate the end face 14a. The flange 68 includes the end face 14a of the valve seat 14 and an external shoulder 70 that faces generally in the axial direction 30. In several example embodiments, the external shoulder 70 lies in a plane that is substantially perpendicular to the axis 66. An external annular recess 72 is formed in the flange 68, axially between the end face 14a and the external shoulder 70. The external annular recess 72 is adapted to be aligned with the one or more openings 62 in the ledge 58. The valve seat 14 also includes an external threaded connection 74 extending axially between the external shoulder 70 and the end face 14b. The external threaded connection 74 of the valve seat 14 is adapted to be threadably engaged with the internal threaded connection 46 of the valve body 12. In several example embodiments, an external annular groove 76 is formed in the valve seat 14, axially between the external threaded connection 74 and the end face 14b.

The cap 20 includes opposing end portions 20a and 20b and an external threaded connection 78 extending axially between the end portions 20a and 20b. The external threaded connection 78 of the cap 20 is adapted to be connected to the internal threaded connection 54 of the valve body 12. Further, the cap 20 includes an end face 80 at the end portion 20b thereof. An external annular groove 82 is formed in the cap 20, axially between the external threaded connection 78 and the end face 80. The cap 20 is adapted to secure the hanger 16 and the clapper 18 within the valve body 12 when the external threaded connection 78 of the cap 20 is threadably engaged with the internal threaded connection 54 of the valve body 12, as will be discussed in further detail below. In several example embodiments, the internal threaded connection 54 of the valve body 12 and the external threaded connection 78 of the cap 20 are omitted or are replaced by other connections utilizing, for example, flanges, fasteners, welds, clamps, or the like.

Figure 2A:
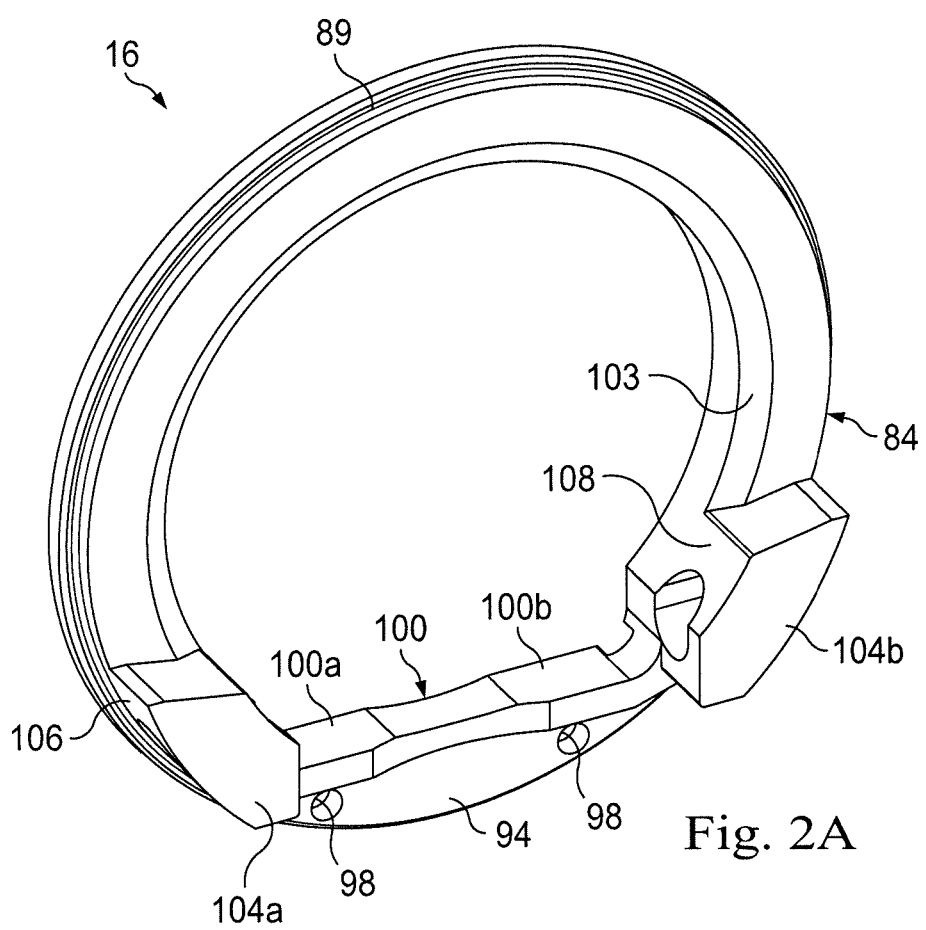
FIG. 2A is a perspective view of the hanger of FIGS. 1A and 1B, according to an example embodiment.
Figures 2B, 2C:
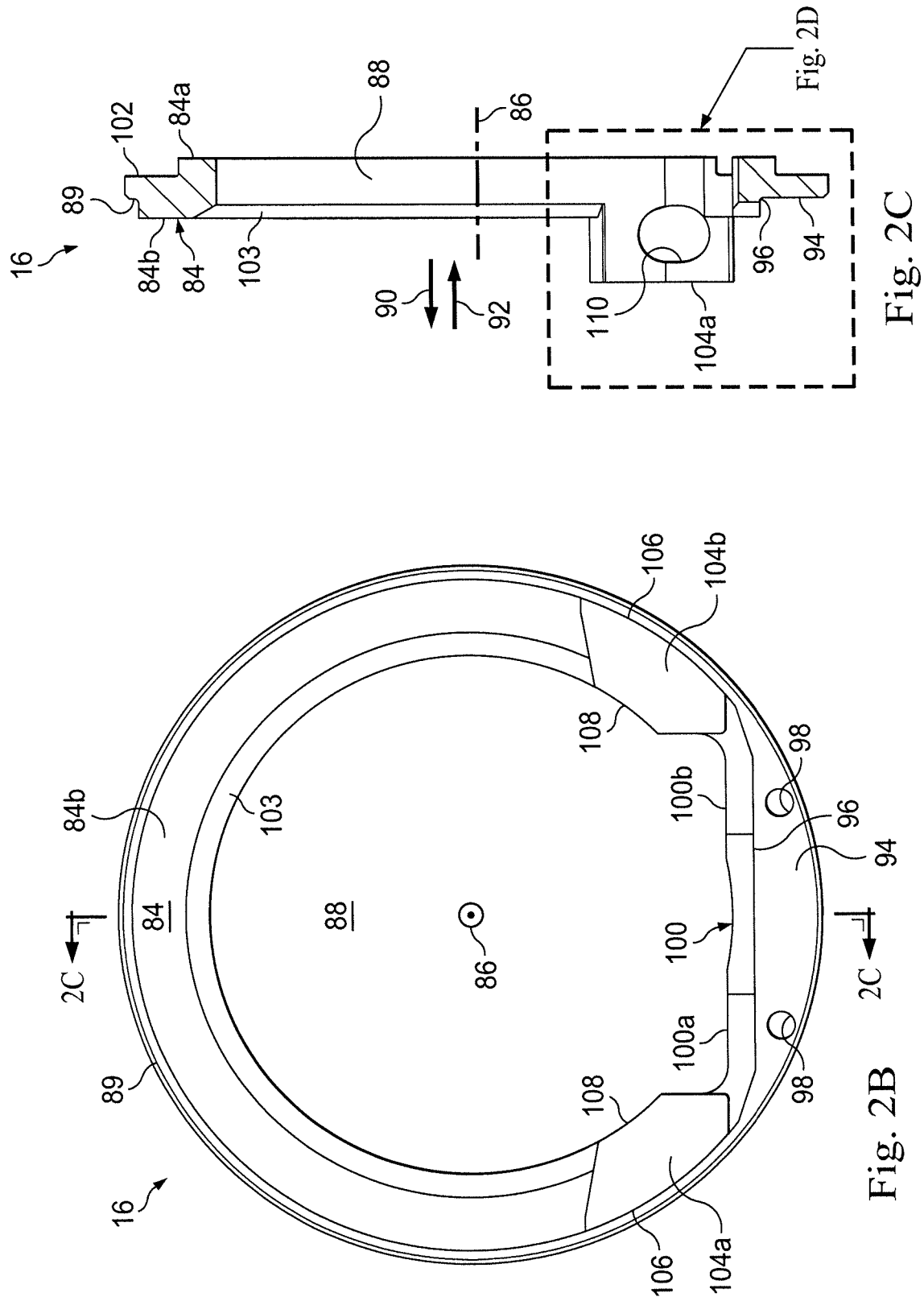
FIG. 2B is an elevational view of the hanger of FIGS. 1A, 1B, and 2A, according to an example embodiment.
FIG. 2C is a cross-sectional view of the hanger of FIGS. 1A, 1B, 2A, and 2B, taken along line 2C-2C of FIG. 2B, according to an example embodiment.
Figure 2D:
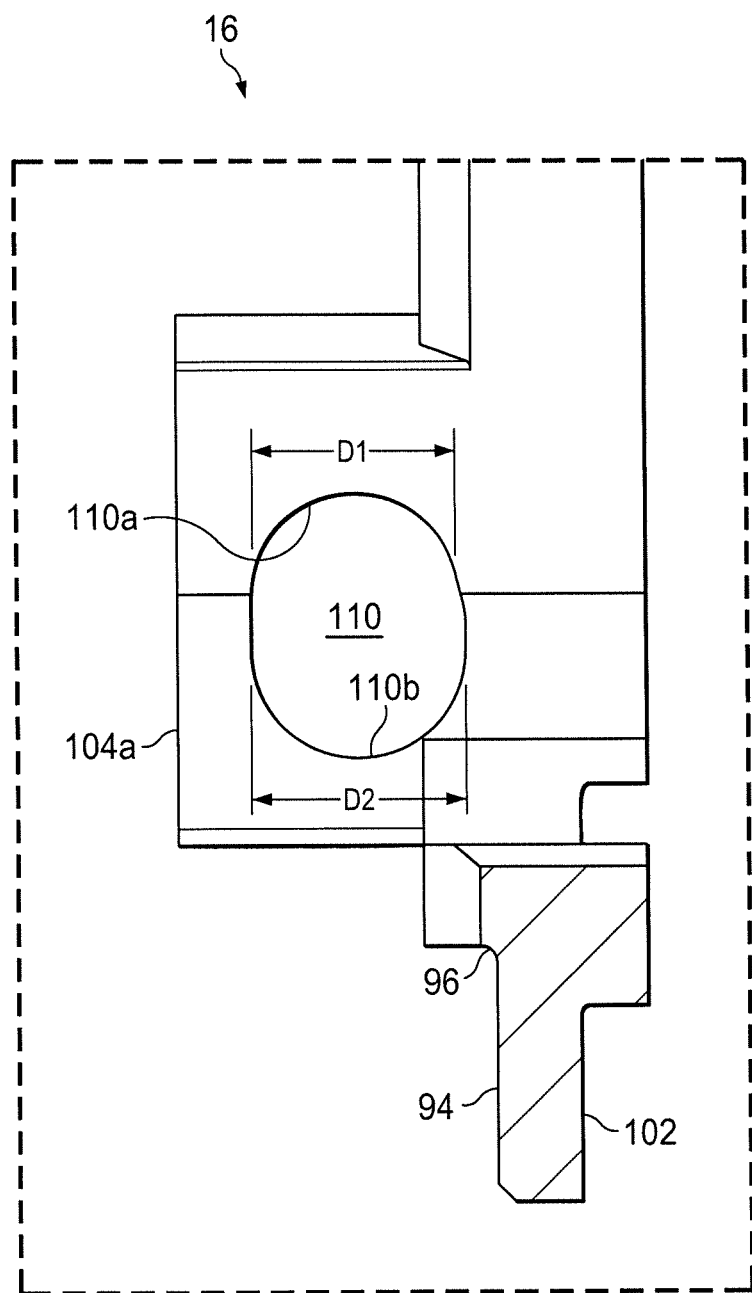
FIG. 2D is an enlarged cross-sectional view depicting a portion of the hanger of FIG. 2C, according to an example embodiment.
Figure 3D:
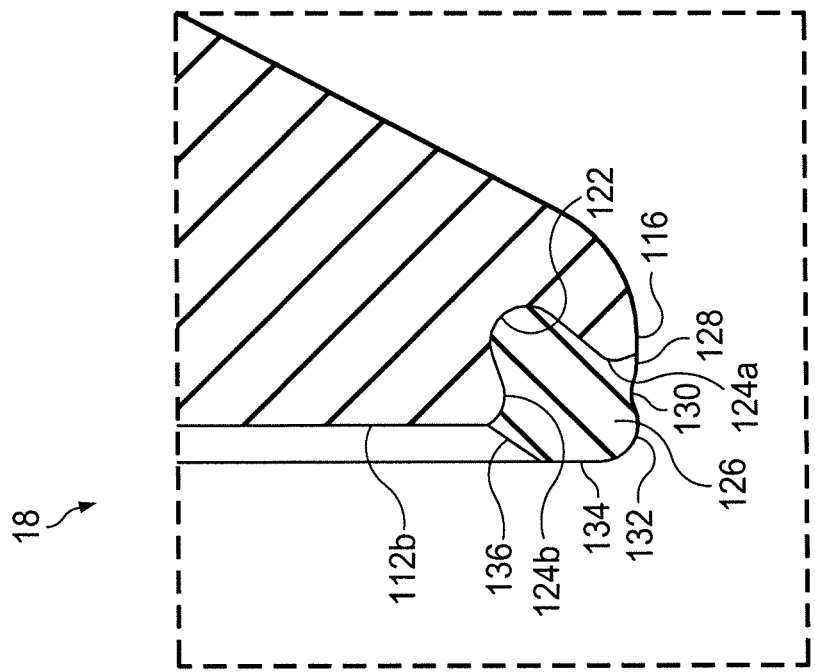
FIG. 3D is an enlarged cross-sectional view depicting a portion of the clapper of FIG. 3C, according to an example embodiment.
Figure 3C:
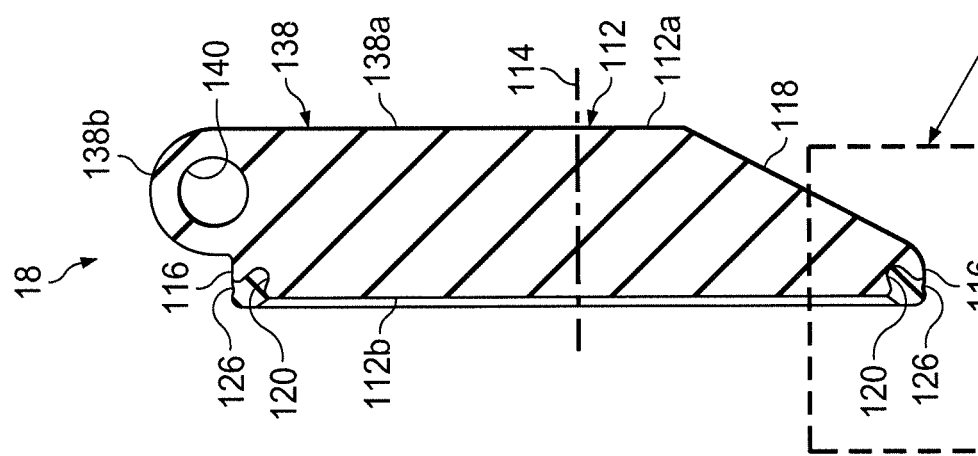
FIG. 3C is a cross-sectional view of the clapper of FIGS. 1A, 1B, 3A, and 3B, taken along line 3C-3C of FIG. 3B, according to an example embodiment.

Referring to FIGS. 2A-2D, with continuing reference to FIGS. 1A and 1B, an example embodiment of the hanger 16 is illustrated. The hanger 16 includes a generally disk-shaped annular body 84 extending about a central axis 86. The annular body 84 includes a central opening 88 and opposing end faces 84a and 84b. An external lip 89 is formed in the periphery of the annular body 84, facing generally in an axial direction 90 (as shown in FIG. 2C). In several example embodiments, the external lip 89 lies in a plane that is substantially perpendicular to the central axis 86. The external lip 89 is offset in an axial direction 92, which is opposite the axial direction 90, from the end face 84b of the annular body 84.

A segment 94 of the external lip 89 has a greater width or radial dimension relative to the central axis 86 than the remainder of the external lip 89. The width or radial dimension of the segment 94 is the distance, along a radial line intersecting the central axis 86, between the outer periphery of the annular body 84 and an edge 96 of the segment 94. The edge 96 of the segment 94 defines a straight profile. In several example embodiments, the edge 96 of the segment 94 is adapted to lie perpendicular to, or substantially perpendicular to, the axis 38 of the inlet and outlet passageways 34 and 36. Alternatively, the edge 96 of the segment 94 may define a curvilinear profile. In any event, the segment 94 has approximately the same radial dimension and shape as the ledge 58 of the valve body 12. One or more openings 98 are formed through the segment 94 of the annular body 84. In several example embodiments, at least one of the openings 98 is aligned with the openings 62 in the ledge 58. A wall portion 100 including opposing end portions 100a and 100b borders the segment 94 along the edge 96. The wall portion 100 is adapted to abut, or nearly abut, the edge 60 of the ledge 58 to act as an anti-rotation device for the hanger 16 within the valve body 12.

An external shoulder 102 is also formed in the periphery of the annular body 84, facing generally in the axial direction 92. In several example embodiments, the external shoulder 102 lies is a plane that is substantially perpendicular to the central axis 86. The external shoulder 102 is offset in the axial direction 90 from the end face 84a of the annular body 84. The annular body 84 further includes an internal angular surface 103 adjoining the end face 84b thereof.

A pair of hinge blocks 104a and 104b are connected to the annular body 84 at the end face 84b thereof. In several example embodiments, the hinge blocks 104a and 104b are integrally formed with the annular body 84. The hinge blocks 104a and 104b are disposed at or near the opposing end portions 100a and 100b, respectively, of the wall portion 100. Moreover, the hinge blocks 104a and 104b each include a curved external surface 106 that is substantially aligned with an external surface of the annular body 84 and a curved interior surface 108 that is substantially aligned with an interior surface of the annular body 84. As a result, the hinge blocks 104a and 104b are spaced apart from one another by the central opening 88 of the annular body 84.

A tapered slot 110 is formed through each of the hinge blocks 104a and 104b. The tapered slots 110 each include opposing end portions 110a and 110b. The end portions 110a of the tapered slots 110 each define an internal dimension D1 that is relatively smaller than an internal dimension D2 defined by the end portions 110b. As a result, when the clapper 18 is in the open configuration, one or more components associated with the clapper 18 are not permitted vertical clearance within the hinge blocks 104a and 104b at the end portions 110a of the tapered slots 110, as will be discussed in further detail below. Moreover, forces imparted on the clapper 18 (or portions thereof) by, for example, fluid flow through the inlet passageway 34, the fluid passageway 64, and the internal region 32 prevent, or at least reduce, horizontal movement of the one or more components associated with the clapper 18 within the hinge blocks 104a and 104b at the end portions 110a of the tapered slots 110. In contrast, the internal dimension D2 defined by the end portions 110b of the tapered slots 110 is relatively larger than the internal dimension D1 defined by the end portions 110a. As a result, when the clapper 18 is in the closed configuration, one or more components associated with the clapper 18 are permitted vertical clearance within the hinge blocks 104a and 104b at the end portions 110b of the tapered slots 110, as will be discussed in further detail below. In several example embodiments, the hinge blocks 104a and 104b are oriented such that the tapered slots 110 are substantially aligned with one another.

Referring to FIGS. 3A-3D, with continuing reference to FIGS. 1A and 1B, an example embodiment of the clapper 18 is illustrated. The clapper 18 includes a generally disk-shaped valve member 112 extending about a central axis 114. The valve member 112 includes a circumferentially-extending exterior surface 116 situated axially between a pair of opposing end faces 112a and 112b. The exterior surface 116 delineates the outer periphery of the valve member 112. In several example embodiments, at least a portion of the exterior surface 116 defines a generally curved profile. The valve member 112 further includes an external angular surface 118 adjoining the end face 112a and the exterior surface 116.

An external annular groove 120 is formed in the end face 112b and the exterior surface 116 of the valve member 112. The external annular groove 120 includes a concave surface 122 and a pair of annular rounds 124a and 124b in the valve member 112. The annular round 124a adjoins the exterior surface 116 of the valve member 112. In several example embodiments, the annular round 124a is axially offset from the end face 112b of the valve member 112. Similarly, the annular round 124b adjoins the end face 112b of the valve member 112. In several example embodiments, the annular round 124b is radially offset from the exterior surface 116 of the valve member 112. The concave surface 122 adjoins each of the annular rounds 124a and 124b.

A seal 126 extends within the external annular groove 120 and includes a circumferentially-extending exterior surface 128 extending adjacent the exterior surface 116 of the valve member 112. The seal 126 includes an annular concave surface 130, an annular bulbous protrusion 132, an annular contact surface 134, and an annular tapered surface 136. The concave surface 130 is formed axially between the exterior surface 116 of the valve member 112 and the bulbous protrusion 132 of the seal 126. In several example embodiments, the bulbous protrusion 132 is situated adjacent the concave surface 130. The contact surface 134 extends radially inward from the bulbous protrusion 132 and is adapted to sealingly engage the end face 14a of the valve seat 14 when the clapper 18 is in the closed configuration, as will be discussed in further detail below. In several example embodiments, the contact surface 134 is axially offset from the end face 112b of the valve member 112. The tapered surface 136 extends inward from the contact surface 134, the extension of the tapered surface 136 ending at, or proximate, the end face 112b of the valve member 112.

A hinge block 138 is connected to the valve member 112 at the end face 112a thereof. In several example embodiments, the hinge block 138 is integrally formed with the valve member 112. The hinge block 138 includes a proximal end portion 138a, located at or near the central axis 114 of the valve member 112, and a distal end portion 138b, extending radially beyond the exterior surface 116 of the valve member 112. A generally cylindrical passage 140 is formed through the hinge block 138 proximate the distal end portion 138b thereof. In several example embodiments, the cylindrical passage 140 extends perpendicular to, or substantially perpendicular to, a radial line intersecting the central axis 114 of the valve member 112. The hinge block 138 is adapted to extend between the hinge blocks 104a and 104b of the hanger 16 so that the cylindrical passage 140 of the clapper 18 is substantially aligned with the tapered slots 110 of the hanger 16.

In several example embodiments, the extension of the seal 126 within the external annular groove 120 facilitates the securing of the seal 126 to valve member 112. In several example embodiments, the seal 126 is bonded to the concave surface 122 and the annular rounds 124a and 124b of the valve member 112. In several example embodiments, the seal 126 is a unitary structure and thus the exterior surface 128, the concave surface 130, the bulbous protrusion 132, the contact surface 134, and the tapered surface 136, as well as the respective portions of the seal 126 extending within the external annular groove 120, are integrally formed.

In several example embodiments, the seal 126 is composed of polyurethane. In several example embodiments, the seal 126 is a unitary structure of polyurethane, and thus the exterior surface 128, the concave surface 130, the bulbous protrusion 132, the contact surface 134, and the tapered surface 136, as well as the respective portions of the seal 126 extending within the external annular groove 120, are integrally formed using polyurethane. In several example embodiments, the seal 126 is composed of polyurethane that is bonded to the concave surface 122 and the annular rounds 124a and 124b of the valve member 112, thus preventing, or at least reducing, damage and/or washout of the seal 126 in the presence of hard abrasive fluids (i.e., sand, chemicals, proppant, or the like).

In an example embodiment, the seal 126 is molded in place in the valve member 112. In an example embodiment, the seal 126 is pre-formed and then attached to the valve member 112. In several example embodiments, the seal 126 is composed of one or more materials such as, for example, a deformable thermoplastic material, a polyurethane material, a fiber-reinforced material, carbon, glass, cotton, wire fibers, cloth, and/or any combination thereof. In an example embodiment, the seal 126 is composed of a cloth which is disposed in a thermoplastic material, and the cloth may include carbon, glass, wire, cotton fibers, and/or any combination thereof. In several example embodiments, the seal 126 is composed of at least a fiber-reinforced material, which can prevent or at least reduce delamination. In several example embodiments, the valve member 112 is much harder and more rigid than the seal 126.

Figure 4A:
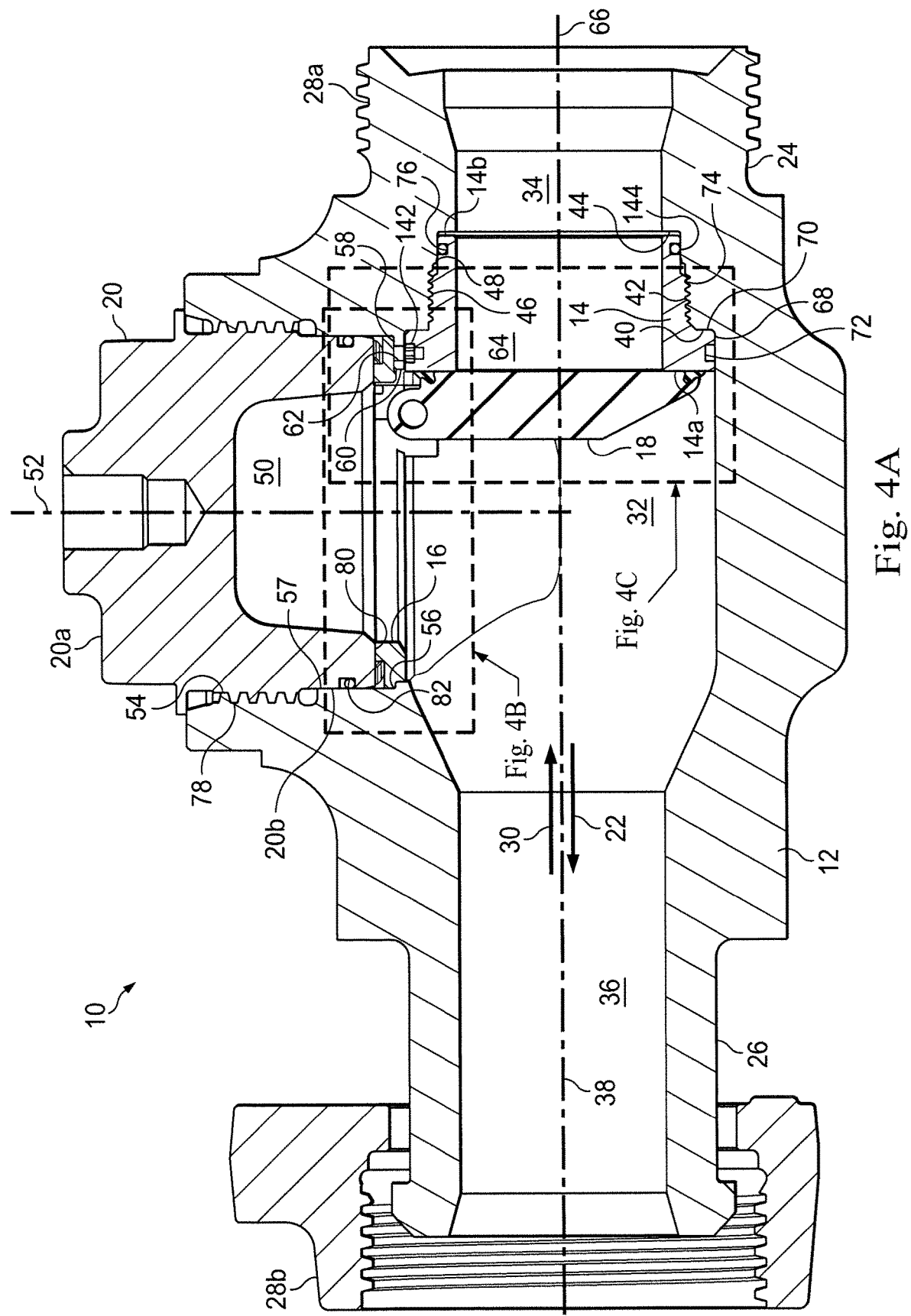
FIG. 4A is a cross-sectional view of the clapper valve of FIGS. 1A, 1B, 2A-2D, and 3A-3D in an assembled state, according to an example embodiment.
Figure 4B:
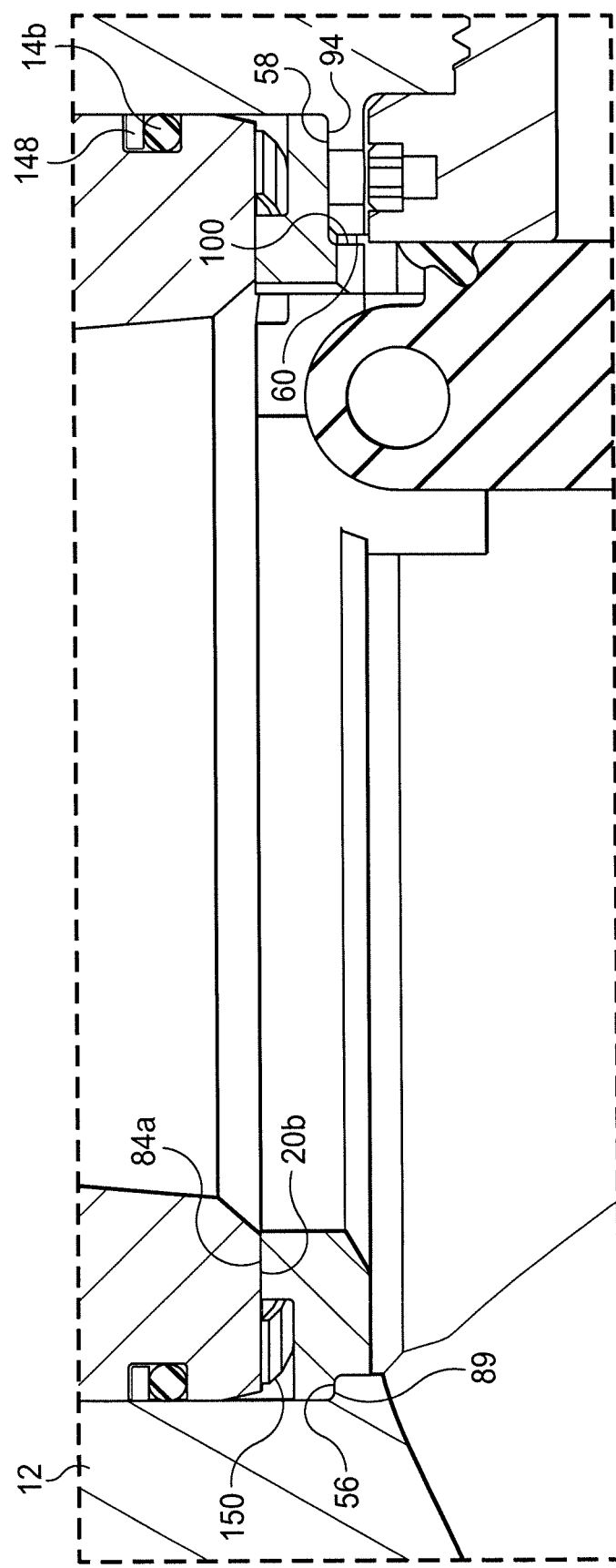
FIG. 4B is an enlarged cross-sectional view depicting a portion of the clapper valve of FIG. 4A, according to an example embodiment.
Figure 4C:
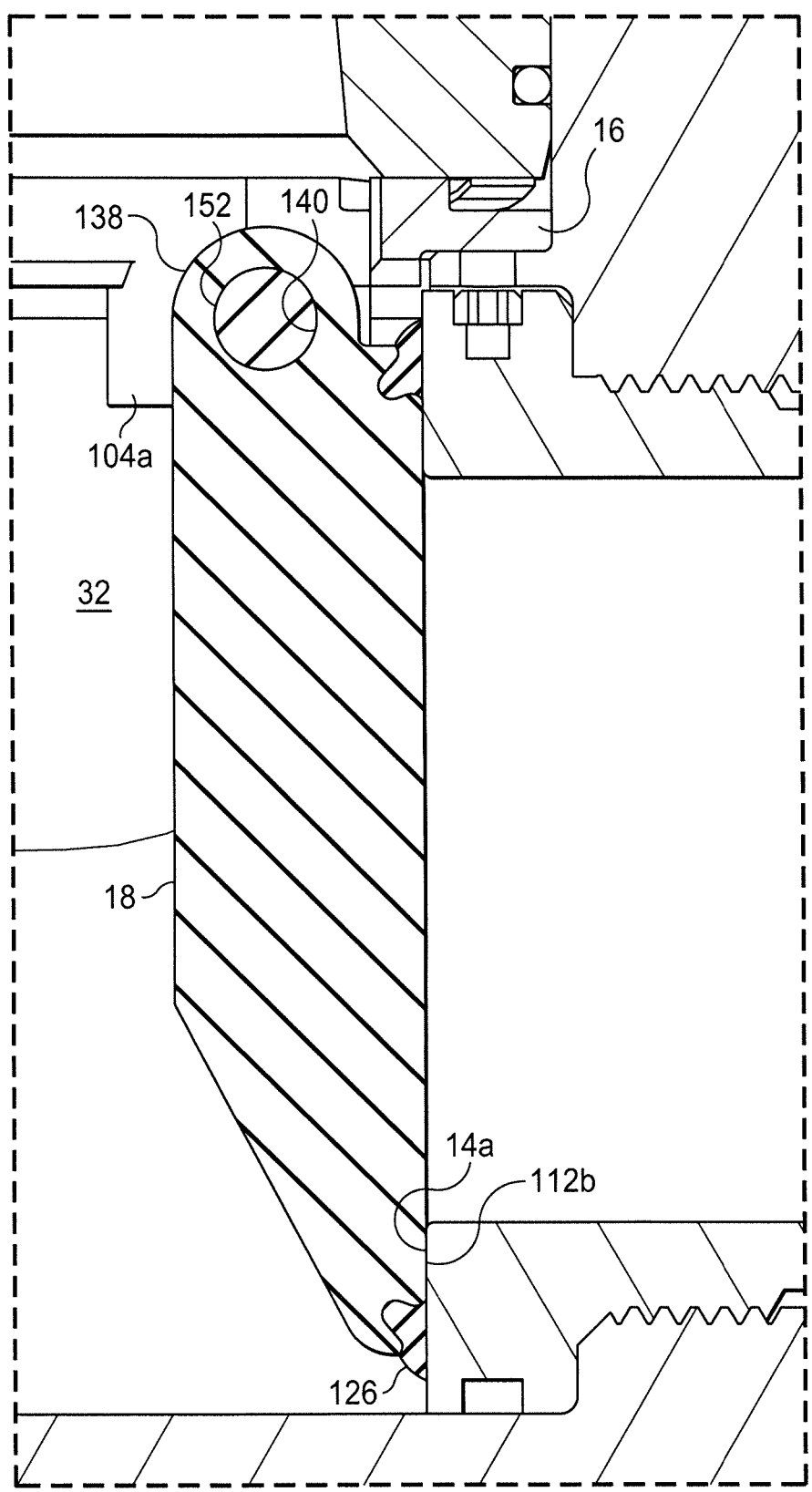
FIG. 4C is an enlarged cross-sectional view depicting another portion of the clapper valve of FIG. 4A, according to an example embodiment.

Referring now to FIGS. 4A-4C, the clapper valve 10 is illustrated in an assembled state, including the valve body 12, the valve seat 14, the hanger 16, the clapper 18, and the cap 20, according to an example embodiment.

In the assembled state, as shown most clearly in FIG. 4A, the valve seat 14 extends within and engages the valve body 12. More particularly, the external threaded connection 74 of the valve seat 14 threadably engages the internal threaded connection 46 of the valve body 12. As a result, the external shoulder 70 of the valve seat 14 engages the internal shoulder 40 of the valve body 12. In this position, the end face 14b of the valve seat 14 abuts, or nearly abuts, the counterbore shoulder 44 of the valve body 12. One or more set screws 142 are engaged (threadably or otherwise) with the valve body 12 at the one or more openings 62 in the ledge 58. Moreover, the external annular recess 72 is aligned with the one or more openings 62 in the ledge 58. As a result, the set screws 142 extend through the openings 62 and into the external annular recess 72, thus preventing, or at least discouraging, the external threaded connection 74 from disengaging the internal threaded connection 46.

In several example embodiments, an annular seal 144 extends within the external annular groove 76 of the valve seat 14 and sealingly engages the cylindrical surface 48 of the valve body 12. In an alternative embodiment, the external annular groove 76 of the valve seat 14 is omitted or replaced by an annular groove (not shown) in which the annular seal 144 extends, which annular groove is formed in the cylindrical surface 48 of the valve body 12. In another alternative embodiment, the annular groove is formed in the end face 14b of the valve seat 14. In yet another alternative embodiment, the annular groove is formed in the counterbore shoulder 44 of the valve body 12.

The annular seal 144 is configured to reduce a force imparted on the annular seal 144 when relative motion is effected between the valve seat 14 and the valve body 12. More particularly, in several example embodiments, the annular seal 144 is a twist-resistant seal that fits within the external annular groove 76 (or, when the annular groove 76 is omitted, another annular groove) to prevent, or at least reduce, distortion of the annular seal 144 when the external threaded connection 74 is threadably engaged with the internal threaded connection 46. For example, the distortion of the annular seal 144 may be prevented, or at least reduced, by providing a twist-resistant seal that facilitates face-to-face contact (rather than point contact) between the annular seal 144 and the cylindrical surface 48 (or between the annular seal 144 and the counterbore shoulder 44). In several exemplary embodiments, to promote said face-to-face contact between the annular seal 144 and the cylindrical surface 48, the annular seal 144 includes a sealing face (e.g., cylindrical or disk-shaped) extending substantially parallel to the portion of the valve body 12 with which the annular seal 144 is adapted to be sealingly engaged (e.g., the cylindrical surface 48 or the counterbore shoulder 44). In several exemplary embodiments, the annular seal 144 has a rectangular cross-section that promotes said face-to-face contact between the annular seal 144 and the cylindrical surface 48.

Further, as shown most clearly in FIG. 4B, the hanger 16 extends within the access bore 50 of the valve body 12. Moreover, the external threaded connection 78 (visible in FIG. 4A) of the cap 20 is threadably engaged with the internal threaded connection 54 (visible in FIG. 4A) of the valve body 12. As a result, the end portion 20b of the cap 20 abuts, or nearly abuts, the end face 84a of the hanger 16, thus causing the external lip 89 of the hanger 16 to engage, or nearly engage, the internal shoulder 56 of the valve body 12. In this manner, the cap 20 secures the hanger 16 within the valve body 12 and causes the segment 94 of the hanger 16 (which has approximately the same radial dimension and shape as the ledge 58 of the valve body 12) to abut, or nearly abut, the ledge 58 of the valve body 12. In this position, the wall portion 100 of the hanger 16 engages the edge 60 of the ledge 58 to act as an anti-rotation device for the hanger 16 within the valve body 12.

In several example embodiments, an annular seal 146 is accommodated within the external annular groove 82 of the cap 20. The annular seal 146 sealingly engages the cylindrical surface 57 of the valve body 12, thus preventing, or at least reducing, leakage of a fluid from the interior of the clapper valve 10 to atmosphere. In several example embodiments, a backup ring 148 is also accommodated within the external annular groove 82 of the cap 20 to prevent, or at least reduce, extrusion of the annular seal 146.

In several example embodiments, a biasing member 150 is constrained between the external shoulder 102 of the hanger 16 and the end portion 20b of the cap 20. In this position, the biasing member 150 urges the external lip 89 of the hanger 16 into engagement, or near engagement, with the internal shoulder 56 of the valve body 12. In an example embodiment, the biasing member 150 is a wave spring. In several example embodiments, the biasing member 150 is, includes, or is part of one or more components that are not a wave spring, such as, for example, a Belleville washer, a helical spring, a compressed elastic material, another type of biasing member, or any combination thereof. In this manner, the cap 20 and the biasing member 150 together act to secure the hanger 16 within the valve body 12. Moreover, the engagement, or near engagement, between the external lip 89 of the hanger 16 and the internal shoulder 56 of the valve body 12 causes the hinge blocks 104a and 104b of the hanger 16 to extend within the internal region 32 of the valve body 12. In several example embodiments, despite the thermal expansion or contraction of the various components of the clapper valve 10 during operation, the biasing member 150 maintains the engagement, or near engagement between the external lip 89 of the hanger 16 and the internal shoulder 56 of the valve body 12.

Further still, as shown most clearly in FIG. 4C, the clapper 18 extends within the internal region 32 of the valve body 12. More particularly, the hinge block 138 of the clapper 18 extends between the hinge blocks 104a and 104b of the hanger 16. As a result, the cylindrical passage 140 of the clapper 18 is substantially aligned with the tapered slots 110 of the hanger 16. A pin 152 extends within the cylindrical passage 140 of the clapper 18 and the tapered slots 110 of the hanger 16, thus pivotably connecting the clapper 18 to the hanger 16. In this position, the clapper 18 is actuable between the open configuration (shown in FIG. 5A; discussed in detail below), in which fluid flow is permitted through the valve body 12, and the closed configuration (shown in FIGS. 4C and 6A; discussed in detail below), in which the clapper 18 is seated against the valve seat 14 to at least partially restrict fluid flow through the valve body 12.

In some example embodiments, as illustrated in FIGS. 5A, 5B, 6A, and 6B, a fluid 154 flows through the clapper valve 10 and actuates the clapper 18 between the open configuration and the closed configuration. The valve body 12 is omitted from FIGS. 5A, 5B, 6A, and 6B to more clearly depict the valve seat 14, the hanger 16, the clapper 18, and the cap 20 (in the assembled state). However, even though the valve body 12 is not shown in FIGS. 5A, 5B, 6A, and 6B, several components of the valve body 12 will be discussed (using the above-mentioned reference numerals) hereinbelow as necessary to describe the operation of the clapper valve 10.

Figure 5A:
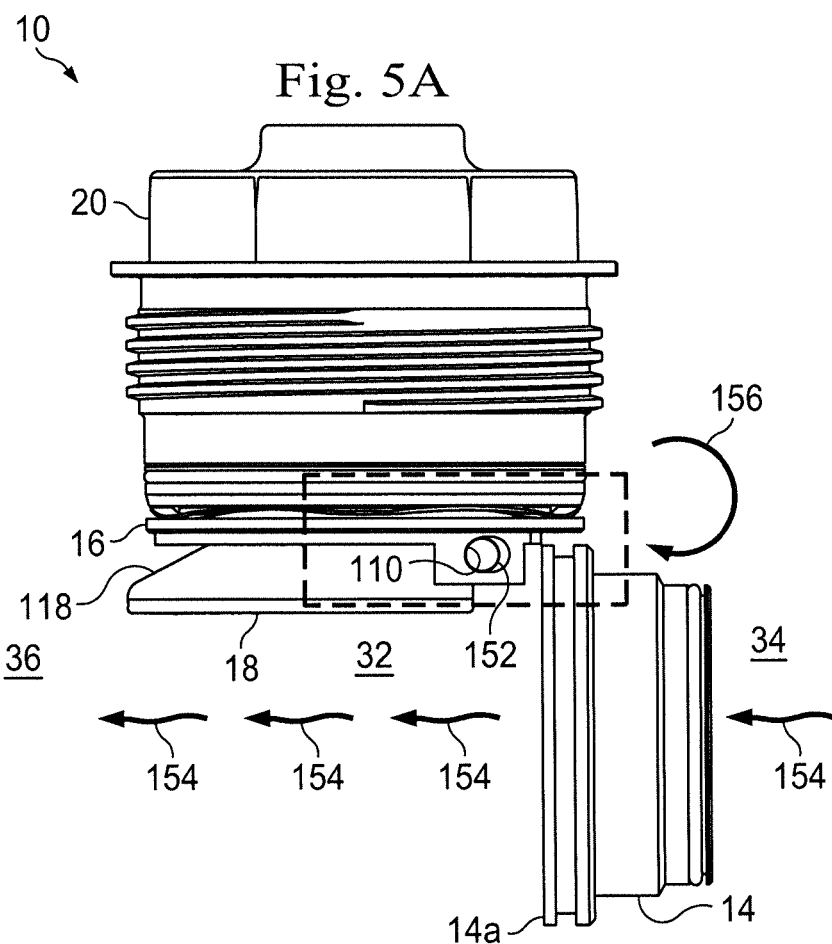
FIG. 5A is an elevational view of the clapper valve of FIGS. 1A, 1B, 2A-2D, 3A-3D, and 4A-4C in an open configuration, including the valve seat, the hanger, the clapper, and the cap, but omitting the valve body, according to an example embodiment.
Figure 5B:
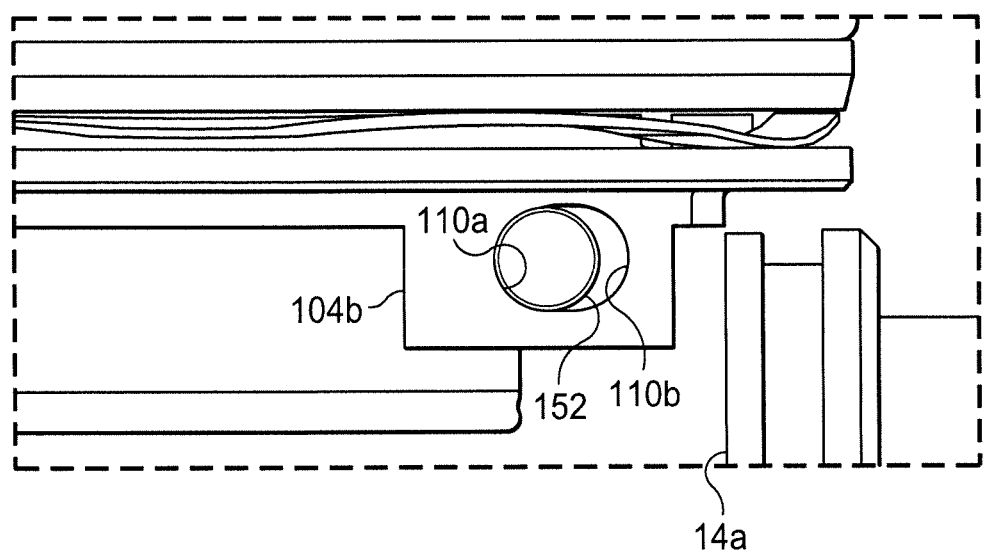
FIG. 5B is an enlarged elevational view depicting a portion of the clapper valve of FIG. 5A in the open configuration, according to an example embodiment.

In the open configuration, as shown in FIGS. 5A and 5B, with continuing reference to FIGS. 4A-4C, the fluid 154 flows into the inlet passageway 34, through the internal region 32, and exits the outlet passageway 36, thus causing the clapper 18 to pivot about the pin 152 in an angular direction 156. As the clapper 18 pivots about the pin 152 in the angular direction 156, the pin 152 is urged (from right to left as viewed in FIGS. 5A and 5B) toward the respective end portions 110a of the tapered slots 110. The pin 152 is not permitted vertical clearance within the hinge blocks 104a and 104b at the end portions 110a of the slots 110 (i.e., the internal dimension D1 of the end portions 110a is relatively smaller than the internal dimension D2 of the end portions 110b). Moreover, forces imparted on the clapper 18 (or portions thereof) by, for example, fluid flow through the inlet passageway 34, the fluid passageway 64, and the internal region 32 prevent, or at least reduce, horizontal movement of the pin 152 within the hinge blocks 104a and 104b at the end portions 110a of the tapered slots 110. As the clapper 18 continues to pivot about the pin 152 in the angular direction 156, the clapper 18 abuts, or nearly abuts, the valve body 12 such that the clapper 18 is prevented from further pivoting in the angular direction 156. In several example embodiments, when the clapper 18 is in the open configuration, the tightened vertical clearance between the pin 152 and the hinge blocks 104a and 104b at the end portions 110a of the tapered slots 110 prevents, or at least reduces, any wear and/or vibration of the hanger 16 and/or the clapper 18 that is caused by, for example, turbulence in the fluid 154. Similarly, the prevention, or at least reduction, of horizontal movement of the pin 152 when the clapper 18 is in the open configuration prevents, or at least reduces, any wear and/or vibration of the hanger 16 and/or the clapper 18 that is caused by, for example, turbulence in the fluid 154.

Figure 6A:
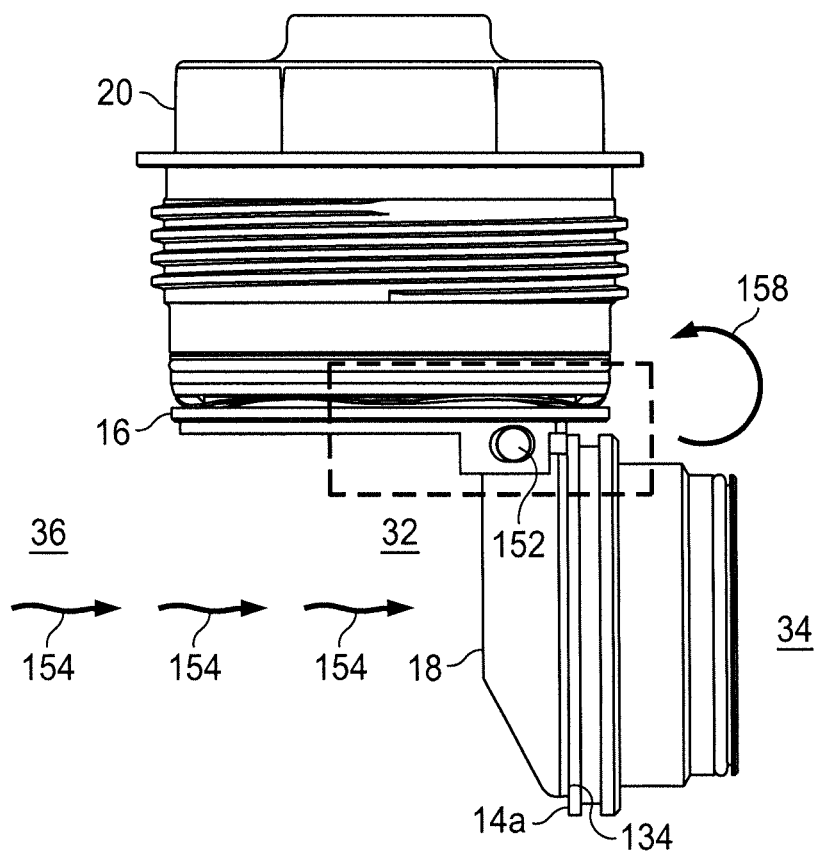
FIG. 6A is an elevational view of the clapper valve of FIGS. 1A, 1B, 2A-2D, 3A-3D, and 4A-4C in a closed configuration, including the valve seat, the hanger, the clapper, and the cap, but omitting the valve body, according to an example embodiment.
Figure 6B:
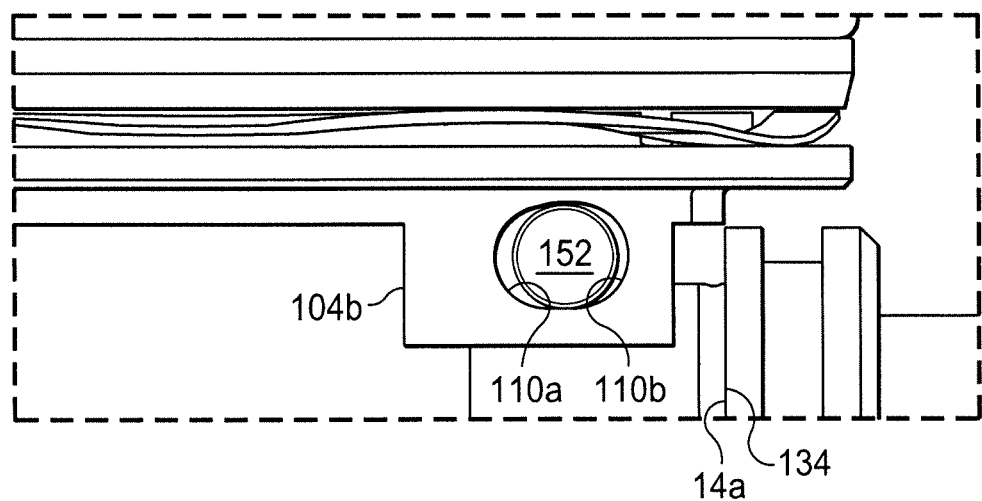
FIG. 6B is an enlarged elevational view depicting a portion of the clapper valve of FIG. 6A in the closed configuration, according to an example embodiment.

In the closed configuration, as shown in FIGS. 6A and 6B, with continuing reference to FIGS. 4A-4C, the flow of the fluid 154 is reversed so that the fluid 154 flows through the outlet passageway 36 and into the internal region 32, thus causing the clapper 18 to pivot about the pin 152 in an angular direction 158, which is opposite the angular direction 156. As the clapper 18 pivots about the pin 152 in the angular direction 158, the pin 152 is urged (from left to right as viewed in FIGS. 6A and 6B) toward the respective end portions 110b of the tapered slots 110. The pin 152 is permitted vertical clearance within the hinge blocks 104a and 104b at the end portions 110b of the slots 110 (i.e., the internal dimension D2 of the end portions 110b is relatively larger than the internal dimension D1 of the end portions 110a). As the clapper 18 continues to pivot about the pin 152 in the angular direction 158, the contact surface 134 of the seal 126 sealingly engages the end face 14a of the valve seat 14. The seal 126 is compressed against the end face 14a and expands radially outward (as shown in FIG. 4C) until the end face 112b of the clapper 18 contacts the end face 14a of the valve seat 14, thus establishing a "hard stop" and limiting further compression of the seal 126. In several example embodiments, the "hard stop" between the end face 112b of the clapper 18 and the end face 14a of the valve seat 14 prevents, or at least reduces, overloading of the seal 126.

In several example embodiments, the sealing engagement of the seal 126 on the valve seat 14 is facilitated by the vertical and/or horizontal clearance between the pin 152 and the hinge blocks 104a and 104b at the end portions 110b of the slots 110. More particularly, the vertical and/or horizontal clearance between the pin 152 and the hinge blocks 104a and 104b at the end portions 110b of the slots 110 allows the seal 126 to seat evenly on the valve seat 14 so that the force imparted to the clapper 18 by the fluid 154 is evenly distributed on the seal 126 and the valve seat 14, as shown in FIG. 4C.

In several example embodiments, the "hard stop" between the clapper 18 and the valve seat 14 is facilitated by the vertical and/or horizontal clearance between the pin 152 and the hinge blocks 104a and 104b at the end portions 110b of the slots 110. More particularly, the vertical and/or horizontal clearance between the pin 152 and the hinge blocks 104a and 104b at the end portions 110b of the slots 110 allows the end face 112b of the clapper 18 to seat evenly on the end face 14a of the valve seat 14 so that the force imparted to the clapper 18 by the fluid 154 is evenly distributed on the respective end faces 112b and 14a, as shown in FIG. 4C.

In several example embodiments, the axial offset of the annular round 124a from the end face 112b of the valve member 112 permits the radially outward expansion of the seal 126 beyond the exterior surface 116 of the valve member 112. In several example embodiments, the axial offset of the annular round 124a from the end face 112b of the valve member 112 prevents, or at least reduces, radially inward expansion of the seal 126 into the space between the end face 112b and the valve seat 14 (i.e., the area where the "hard stop" is established). In several example embodiments, the axial offset of the annular round 124a from the end face 112b of the valve member 112 prevents, or at least reduces, overloading of the seal 126.

In several example embodiments, the radial offset of the annular round 124b from the exterior surface 116 of the valve member 112 permits the contact surface 134 of the seal 126 to extend axially beyond the end face 112b of the valve member 112. In several example embodiments, the radial offset of the annular round 124b from the exterior surface 116 of the valve member 112 permits engagement between the seal 126 and the valve seat 14 before the end face 112b engages the valve seat 14. In several example embodiments, the radial offset of the annular round 124b from the exterior surface 116 of the valve member 112 permits proper loading of the seal 126.

In several example embodiments, the shape or profile of the seal 126 permits the radially outward expansion of the seal 126 beyond the exterior surface 116 of the valve member 112. In several example embodiments, the shape or profile of the seal 126 prevents, or at least reduces, radially inward expansion of the seal 126 into the space between the end face 112b and the valve seat 14 (i.e., the area where the "hard stop" is established). In several example embodiments, the shape or profile of the seal 126 prevents, or at least reduces, overloading of the seal 126.

In several example embodiments, the biasing member 150 prevents, or at least reduces, wear and vibration of the hanger 16 and or the clapper 18 caused by, for example, turbulence in the fluid 154. In several example embodiments, the biasing member 150 permits flexibility of dimensional tolerances between various components of the clapper valve 10. In several example embodiments, the biasing member 150 reduces rigidity between various components of the clapper valve 10.

It is understood that variations may be made in the foregoing without departing from the scope of the present disclosure.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different steps, processes, and procedures are described as appearing as distinct acts, one or more of the steps, one or more of the processes, and/or one or more of the procedures may also be performed in different orders, simultaneously and/or sequentially. In several example embodiments, the steps, processes, and/or procedures may be merged into one or more steps, processes and/or procedures.

In several example embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are exemplary only and are not limiting, and those skilled in the art will readily appreciate that many other modifications, changes and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A valve assembly, comprising:
    a valve body defining an internal region, an inlet passageway, and an outlet passageway, wherein the inlet and outlet passageways extend into the internal region, wherein the valve body further defines an access bore extending into the internal region;
    a valve seat defining a fluid passageway;
    a hanger defining one or more tapered slots, with the hanger extending within the access bore and having an annular body with a central opening, wherein the hanger further includes a wall portion adapted to prevent rotation of the hanger within the access bore;
    a valve member pivotably coupled to the hanger, wherein the valve member is actuable between an open configuration, in which fluid flow is permitted through the fluid passageway, and a closed configuration, in which the valve member engages the valve seat to at least partially restrict fluid flow through the fluid passageway; and
    a pin extending within the one or more tapered slots to pivotably couple the valve member to the hanger.

2. The valve assembly of claim 1, wherein the one or more tapered slots each define opposing first and second end portions having first and second internal dimensions, respectively, the first internal dimension being smaller than the second internal dimension.

3. The valve assembly of claim 2, wherein, in the open configuration, the pin is forced toward the first end portion of at least one of the one or more tapered slots so that the pin is at least partially restricted from at least one of moving vertically or moving horizontally relative to the hanger.

4. The valve assembly of claim 2, wherein, in the closed configuration, the pin is forced toward the second end portion of the at least one of the one or more tapered slots to allow the pin to at least partially move at least one of vertically or horizontally relative to the hanger.

5. The valve assembly of claim 1, wherein the valve member defines a cylindrical passage in which the pin also extends.

6. The valve assembly of claim 5, wherein the hanger comprises one or more hinge blocks into which the one or more tapered slots are formed; and
    wherein the valve member comprises another hinge block into which the cylindrical passage is formed.

7. The valve assembly of claim 1, wherein the access bore includes an internal shoulder; and
    wherein the valve assembly further comprises a cap coupled to the valve body at the access bore and a biasing member compressed between the cap and the hanger to force the hanger toward the internal shoulder of the access.

8. The valve assembly of claim 7, wherein the hanger includes an external shoulder against which the biasing member is compressed.

9. The valve assembly of claim 7, wherein the hanger includes an external lip that is forced against the internal shoulder of the valve body by the biasing member.

10. The valve assembly of claim 9, wherein the external lip is axially offset from an axial end face of the annular body of the hanger, with the external lip including a segment adjacent to the wall portion having a greater radial dimension than other portions of the external lip.

11. A hanger to which a valve member is pivotably coupled with a pin so that the valve member is actuable between an open configuration, in which fluid flow is permitted through a valve seat of a valve assembly, and a closed configuration, in which the valve member engages the valve seat to at least partially restrict fluid flow through the valve seat, the hanger comprising:
    an annular body;
    an external lip adapted to engage an internal shoulder in an access bore of the valve assembly, wherein the external lip is adapted to be forced against the internal shoulder by a biasing member compressed between a cap of the valve assembly and the hanger, with the cap extending within the access bore;

one or more hinge blocks connected to the annular body; and one or more tapered slots formed into the one or more hinge blocks;

wherein the pin extends within the one or more tapered slots to pivotably couple the valve member to the hanger.

12. The hanger of claim 11, wherein the one or more tapered slots each define opposing first and second end portions having first and second internal dimensions, respectively, the first internal dimension being smaller than the second internal dimension.

13. The hanger of claim 12, wherein, in the open configuration, the pin is forced toward the first end portion of at least one of the one or more tapered slots so that the pin is at least partially restricted from moving vertically and/or horizontally relative to the hanger.

14. The hanger of claim 12, wherein, in the closed configuration, the pin is forced toward the second end portion of the at least one of the one or more tapered slots to allow the pin to at least partially move vertically and/or horizontally relative to the hanger.

15. The hanger of claim 11, wherein the valve member defines a cylindrical passage in which the pin also extends; and wherein the valve member comprises another hinge block into which the cylindrical passage is formed.

16. A valve assembly, comprising:

a valve body defining an internal region, an inlet passageway, an outlet passageway, and an access bore, wherein the inlet and outlet passageways and the access bore extend into the internal region and the access bore includes an internal shoulder;

a valve seat defining a fluid passageway;

a hanger defining one or more slots, with the hanger extending within the access bore and having an annular body with a central opening;

a cap coupled to the valve body at the access bore;

a biasing member compressed between the cap and the hanger to force the hanger toward the internal shoulder of the access bore;

a valve member pivotably coupled to the hanger, wherein the valve member is actuable between an open configuration, in which fluid flow is permitted through the fluid passageway, and a closed configuration, in which the valve member engages the valve seat to at least partially restrict fluid flow through the fluid passageway; and a pin extending within the one or more slots to pivotably couple the valve member to the hanger.

17. The valve assembly of claim 16, wherein the hanger includes an external shoulder against which the biasing member is compressed.

18. The valve assembly of claim 16, wherein the hanger includes an external lip that is forced against the internal shoulder of the valve body by the biasing member.

19. The valve assembly of claim 18, wherein the hanger further includes a wall portion adapted to prevent rotation of the hanger within the access bore.

20. The valve assembly of claim 19, wherein the external lip is axially offset from an axial end face of the annular body of the hanger, with the external lip including a segment adjacent to the wall portion having a greater radial dimension than other portions of the external lip.

* * * * *